(12) United States Patent
Ozeki et al.

(10) Patent No.: US 10,682,978 B2
(45) Date of Patent: Jun. 16, 2020

(54) AIRBAG DEVICE FOR PEDESTRIAN PROJECTION

(71) Applicant: TOYODA GOSEI CO., LTD., Kiyosu-shi, Aichi-ken (JP)

(72) Inventors: Makoto Ozeki, Kiyosu (JP); Takashi Sasaki, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 113 days.

(21) Appl. No.: 15/928,173

(22) Filed: Mar. 22, 2018

(65) Prior Publication Data
US 2018/0281743 A1 Oct. 4, 2018

(30) Foreign Application Priority Data

Mar. 31, 2017 (JP) .................................. 2017-70912

(51) Int. Cl.
*B60R 21/36* (2011.01)
*B60R 21/217* (2011.01)
(Continued)

(52) U.S. Cl.
CPC ............ *B60R 21/36* (2013.01); *B60R 21/217* (2013.01); *B60R 21/38* (2013.01); *B60R 2021/23382* (2013.01); *B60R 2021/23386* (2013.01)

(58) Field of Classification Search
CPC . B60R 21/217; B60R 21/2171; B60R 21/237; B60R 21/262; B60R 21/36;
(Continued)

(56) References Cited

U.S. PATENT DOCUMENTS

| 6,923,286 B2 * | 8/2005 | Sato ........................ B60R 21/36 180/274 |
| 7,025,164 B2 * | 4/2006 | Takimoto ............ B60R 21/2346 180/271 |

(Continued)

FOREIGN PATENT DOCUMENTS

| JP | 2003252145 A | * | 9/2003 | ............ B60S 1/0488 |
| JP | 2003291756 A | * | 10/2003 | ............ B60R 21/36 |

(Continued)

OTHER PUBLICATIONS

Office Action dated Feb. 6, 2020 issued in corresponding JP patent application No. 2017-070912 (and English translation).

*Primary Examiner* — Laura Freedman
(74) *Attorney, Agent, or Firm* — Posz Law Group, PLC

(57) ABSTRACT

An airbag device for pedestrian protection to mount on a vicinity of the rear end of a vehicle hood. The airbag includes a transverse inflatable portion that covers a cowl of the vehicle generally entirely in the vehicle width direction when deployed, and an inlet port in a front end region of the transverse inflatable portion to couple with an inflator. The airbag is stored folded-up in a housing. The airbag is folded up through a front-rear contracting step that provides a front-rear contracted bag, i.e. the airbag which has gone through the front-rear contracting step, and a transversely contracting step which folds the front-rear contracted bag with a crease at a vicinity of an outer end in a left and right direction of the inlet port. A transversely-contracted fold portion formed in the transversely contracting step and the inlet port are arranged in a stratified fashion.

4 Claims, 29 Drawing Sheets

(51) Int. Cl.
  *B60R 21/38* (2011.01)
  *B60R 21/2338* (2011.01)

(58) Field of Classification Search
  CPC .......... B60R 21/38; B60R 2021/23382; B60R 2021/23386; B60R 2021/2612
  See application file for complete search history.

(56) References Cited

U.S. PATENT DOCUMENTS

| | | | |
|---|---|---|---|
| 7,090,243 B2 * | 8/2006 | Igawa | B60R 21/2171 280/728.2 |
| 7,845,454 B2 * | 12/2010 | Takimoto | B60R 21/2338 180/274 |
| 8,985,257 B2 * | 3/2015 | Tanaka | B60R 21/237 180/274 |
| 9,102,306 B2 * | 8/2015 | Kitte | B60R 21/36 |
| 9,346,432 B2 * | 5/2016 | Sugimoto | B60R 21/237 |
| 9,809,190 B2 * | 11/2017 | Mazanek | B60R 21/36 |
| 2014/0291054 A1 * | 10/2014 | Tanaka | B60R 21/36 180/274 |
| 2016/0229373 A1 | 8/2016 | Higashimachi | |

FOREIGN PATENT DOCUMENTS

| | | | |
|---|---|---|---|
| JP | 2005-350028 A | | 12/2005 |
| JP | 2006044289 A | * | 2/2006 |
| JP | 2007153062 A | * | 6/2007 |
| JP | 2007261510 A | * | 10/2007 |
| JP | 2014-196064 A | | 10/2014 |
| JP | 2014-208513 A | | 11/2014 |
| JP | 2015134565 A | * | 7/2015 |
| JP | 2016-147547 A | | 8/2016 |

* cited by examiner

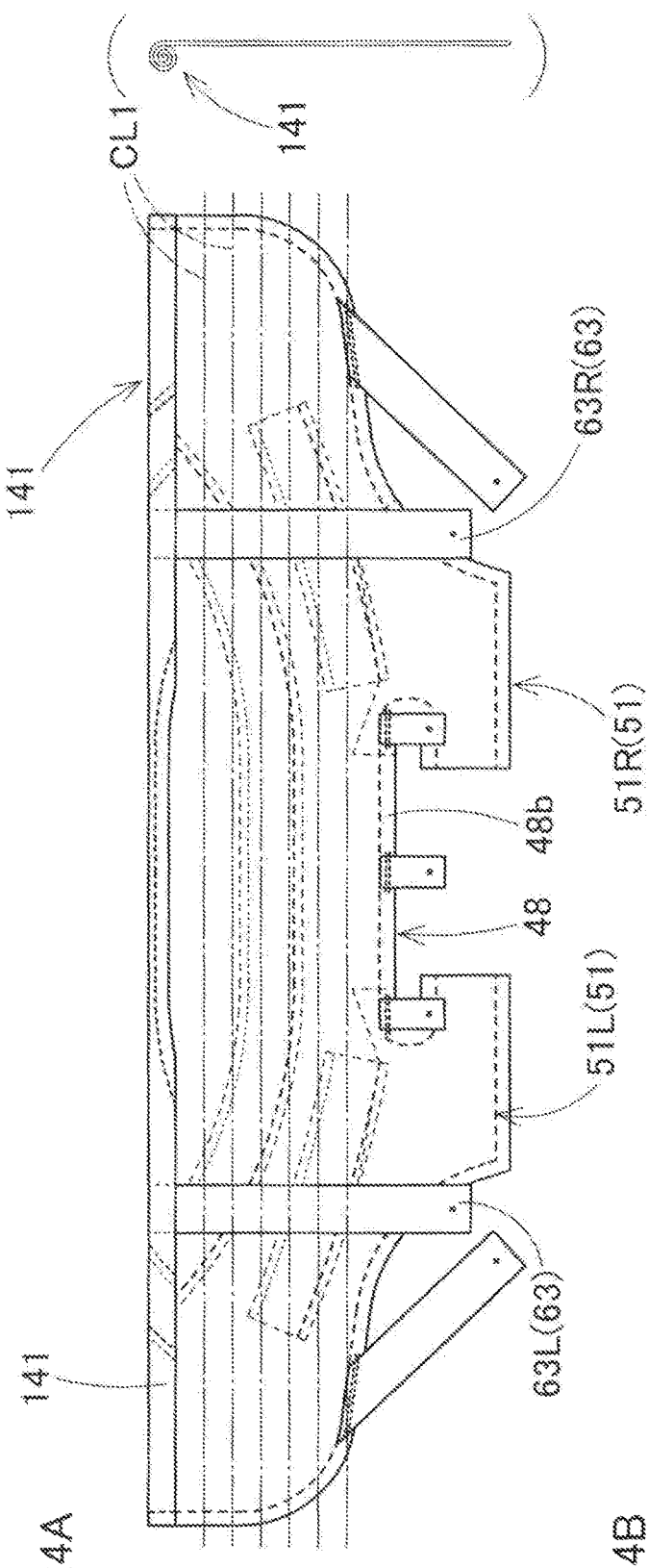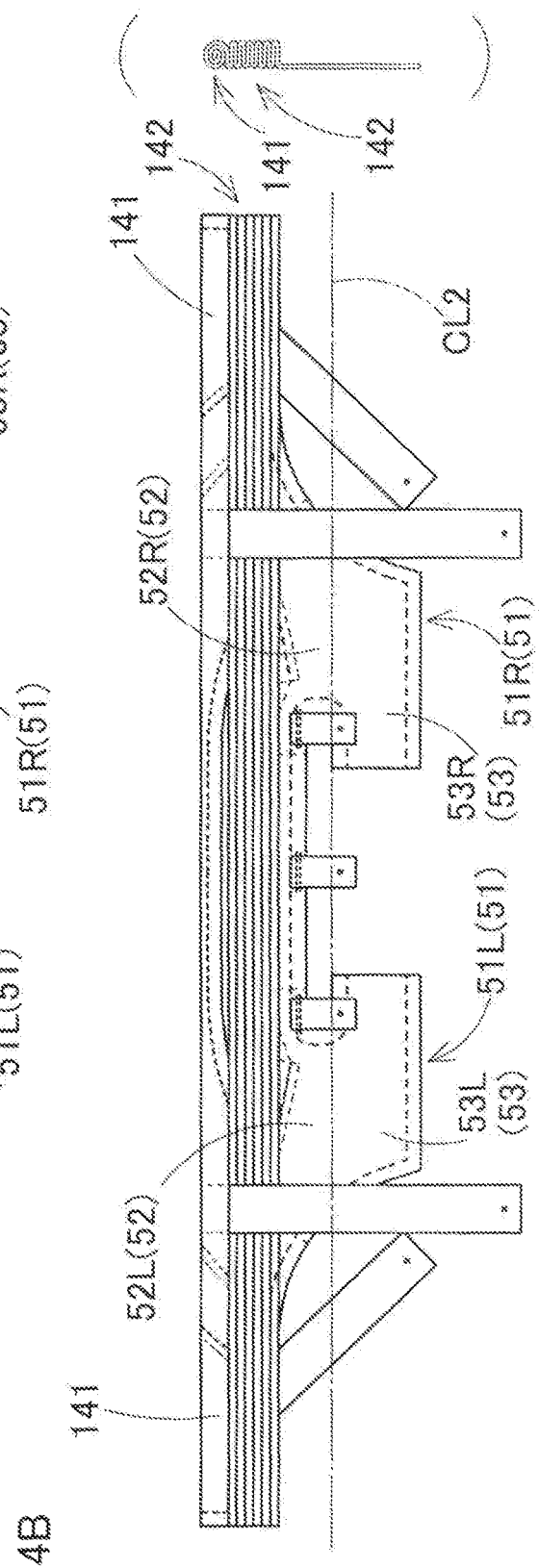

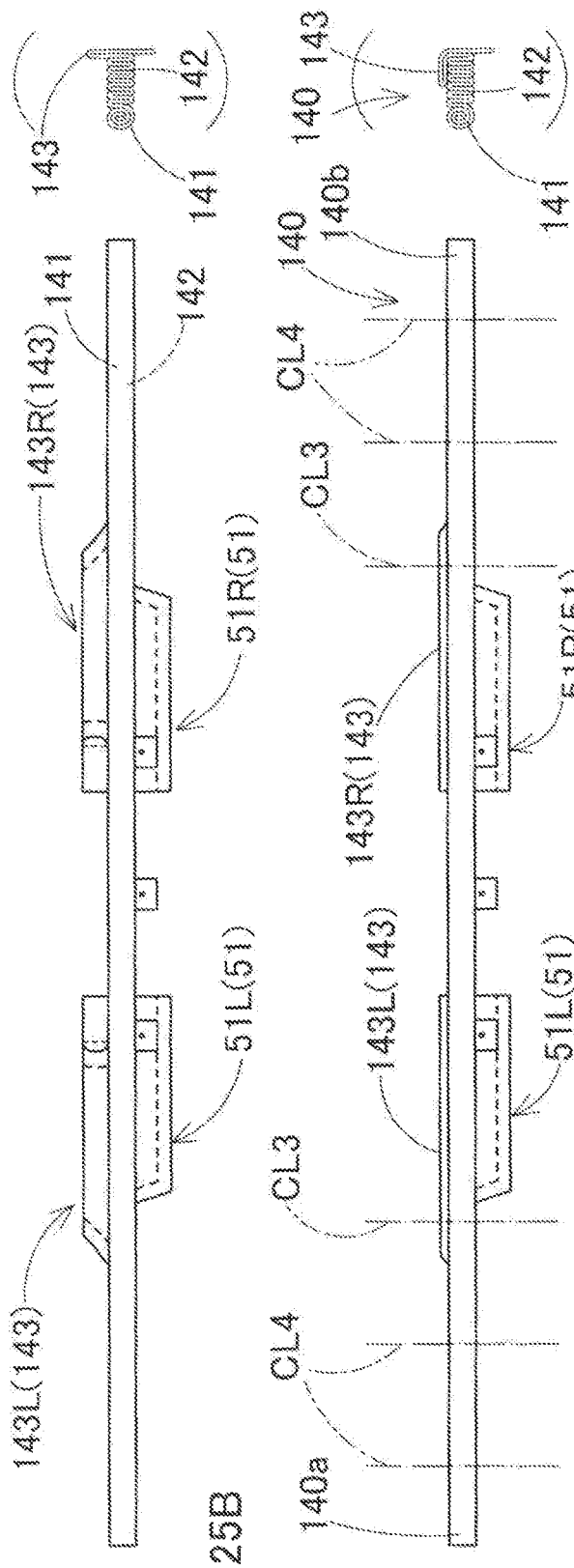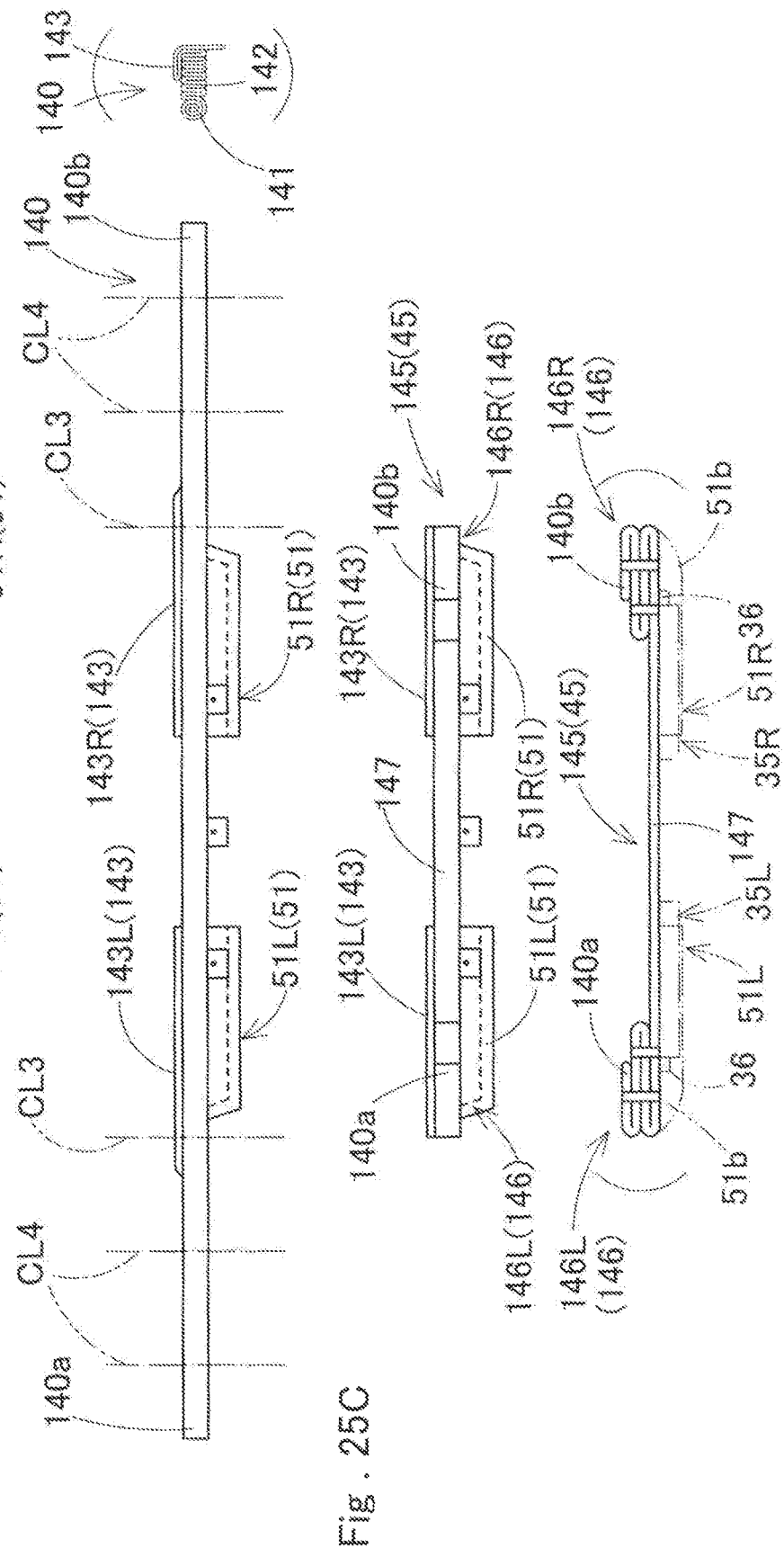
Fig. 25A
Fig. 25B
Fig. 25C

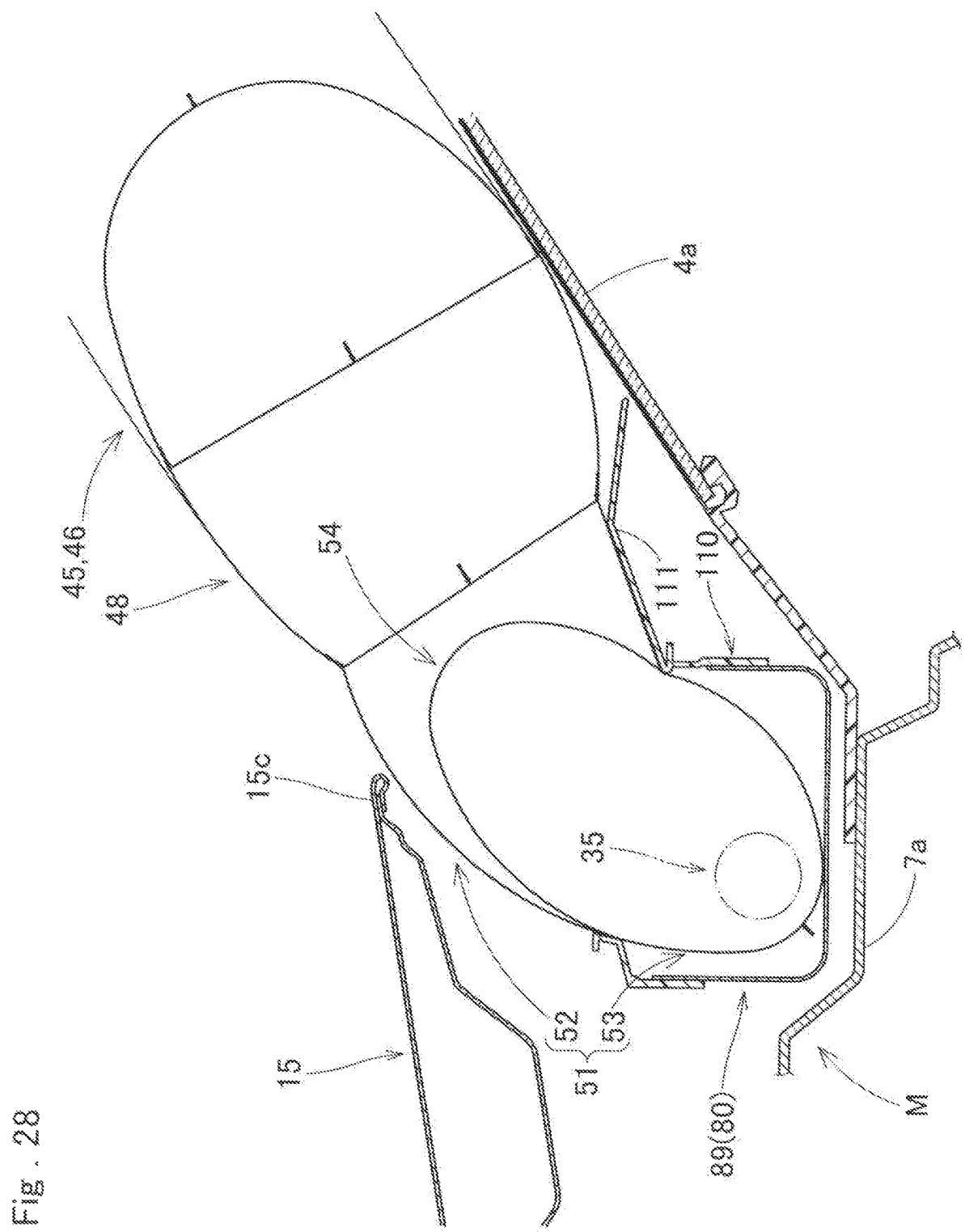

AIRBAG DEVICE FOR PEDESTRIAN PROJECTION

CROSS REFERENCE TO RELATED APPLICATIONS

The present application claims priority from Japanese Patent Application No. 2017-070912 of Ozeki et al., filed on Mar. 31, 2017, the entire disclosure of which is incorporated herein by reference.

BACKGROUND OF THE INVENTION

1. Field of the Invention

The present invention relates to an airbag device for pedestrian protection that is adapted to be mounted on a vicinity of the rear end of a vehicle hood. More particularly, the invention relates to an airbag device for pedestrian protection that includes an airbag which is stored in a folded-up configuration so as to be inflatable with an inflation gas fed by an inflator.

2. Description of Related Art

JP 2014-196064 A discloses an airbag device for pedestrian protection which includes an airbag inflatable with an inflation gas fed by an inflator. The airbag is stored in a housing in a folded-up configuration, and includes a transverse inflatable portion which is designed to cover an area at the rear of the vehicle hood generally entirely in a width direction of the vehicle when deployed, and a pair of vertical inflatable portions which extend rearward from the left and right ends of the transverse inflatable portion. The airbag has been folded up through a front-rear contracting folding step which reduces the airbag in size in a front and rear direction and provides a front-rear contracted bag, which is a form of the airbag having gone through the front-rear contracting folding step, and a transversely contracting folding step which reduces the front-rear contracted bag in size in a left and right direction. The airbag includes an inlet section of the inflation gas generally at the center in the left and right direction of the front edge of the transverse inflatable portion as deployed. When stored in the housing in the folded-up configuration, this inlet section is disposed in a vicinity of the rear edge of the transverse inflatable portion and beneath the vertical inflatable portions as folded up.

In the conventional airbag device described above, since the inlet section is disposed beneath the rest of the airbag inside the housing, the inlet section is inflated first and pushes up the rest of the airbag in an initial stage of airbag deployment, which helps deploy the airbag quickly. However, the conventional airbag device is problematic in that a transversely-contracted fold portion, which is formed in the transversely contracting folding step, is disposed apart from the inlet section of the airbag in a left and right direction, and thus it takes a while until the inflation gas fed from the inflator effects an unfolding of the transversely-contracted fold portion. Therefore, an improvement has been sought for quick unfolding of the transversely-contracted fold portion.

SUMMARY OF THE INVENTION

The object of the present invention is to provide an airbag device for pedestrian protection that is capable of inflating an airbag quickly.

The object of the invention will be attained by the following airbag device for pedestrian protection:

The airbag device is adapted to be mounted on a vehicle which includes a hood and a cowl disposed below a rear edge of the hood. The airbag device includes a housing that is adapted to be mounted on a vicinity of the rear end of the hood, an airbag that is stored in the housing in a folded-up configuration and is inflatable with an inflation gas, and an inflator which feeds the airbag with the inflation gas. The airbag is designed to protrude from the housing at deployment. The airbag includes:

a transverse inflatable portion that is designed to be deployed generally along the width direction of the vehicle in order to cover the cowl generally entirely in the vehicle width direction; and an inlet port section that is disposed in a vicinity of the front end of the transverse inflatable portion to be coupled with the inflator in order to take in the inflation gas, the inlet port section being formed into a tube deployable generally along the vehicle width direction.

At least the transverse inflatable portion is formed by sewing together circumferential edges of a vehicle-side wall, which is deployable on a lower side, and a pedestrian-side wall, which is deployable on an upper side. The vehicle-side wall and pedestrian-side wall are generally identical in outer contour. The airbag has been folded up from the state in which the vehicle-side wall and the pedestrian-side wall were developed and flattened, through a front-rear contracting folding step and a transversely contracting folding step. The front-rear contracting folding step reduces the airbag in size in a front and rear direction and provides a front-rear contracted bag, which is a form of the airbag which has gone through the front-rear contracting folding step. The transversely contracting folding step reduces the front-rear contracted bag in size in a left and right direction. In the transversely contracting folding step, specifically, the front-rear contracted bag is folded back with a crease at a vicinity of an outer end in a left and right direction of the inlet port section. Thus the airbag as folded up includes a transversely-contracted fold portion, which is a portion of the airbag folded up in the transversely contracting folding step. The transversely-contracted fold portion and the inlet port section are arranged in a stratified fashion.

In the airbag device for pedestrian protection of the invention, in the airbag as folded up, the transversely-contracted fold portion formed in the transversely contracting folding step and the inlet port section are arranged in a stratified fashion inside the housing. With this configuration, in an initial stage of airbag deployment, the inlet port section firstly takes in an inflation gas and is inflated into a tube, and then pushes up the transversely-contracted fold portion directly and push them out of the housing. Then the transversely-contracted fold portion unfolds and is deployed quickly. Therefore, although the airbag is great in size in a left and right direction enough to cover an entire area in the vehicle width direction of the cowl, the airbag device of the invention is capable of quickly deploying the transversely contracted fold portion, which was formed in the transversely-contracting folding step, in the initial stage of airbag deployment, and is capable of deploying the airbag more quickly than a conventional airbag device for pedestrian protection.

Therefore, the airbag device for pedestrian protection of the invention is capable of deploying the airbag quickly.

In the airbag device of the invention, it is desired to place the inlet port section at two positions spaced-apart in the vehicle width direction and place the inflator at two positions spaced-apart in the vehicle width direction correspondingly thereto. This configuration will help inflate the airbag quickly in a balanced fashion in the vehicle width direction (i.e. in the left and right direction) with the two inlet port sections, especially when the transverse inflatable portion is elongated in the vehicle width direction.

In the airbag device of the invention, moreover, if the transversely-contracted fold portion is disposed at the rear of each of the inlet port sections in the housing, the inlet port sections as has taken in an inflation gas and been inflated will be able to push the transversely-contracted fold portion rearward in the initial stage of airbag deployment.

In the airbag device of the invention, furthermore, it is desired that:
each of the inflators is cylindrical in outer contour and includes a gas releasing region for discharging the inflation gas at an end region in the axial direction thereof;
the two inflators are stored inside the housing such that the inflators extend generally along the vehicle width direction and the gas releasing regions face away from each other when mounted on the vehicle; and
a central folded-up portion, which is disposed generally at the center in the vehicle width direction of the airbag as folded up, is disposed on the inflators in the housing.

This configuration will be conducive to reduction of width in a front and rear direction of an area of the housing for storing the central folded-up portion, and further conducive to size reduction of the whole housing.

BRIEF DESCRIPTION OF DRAWINGS

FIGS. 23, 24A, 24B, 25A, 25B and 25C illustrate the folding process of the airbag of the embodiment step by step;
FIG. 28 is a schematic vertical sectional view of the airbag device as has completed deployment of the airbag, taken at the location of an inlet port section of the airbag.

DESCRIPTION OF PREFERRED EMBODIMENTS

Figure 1:
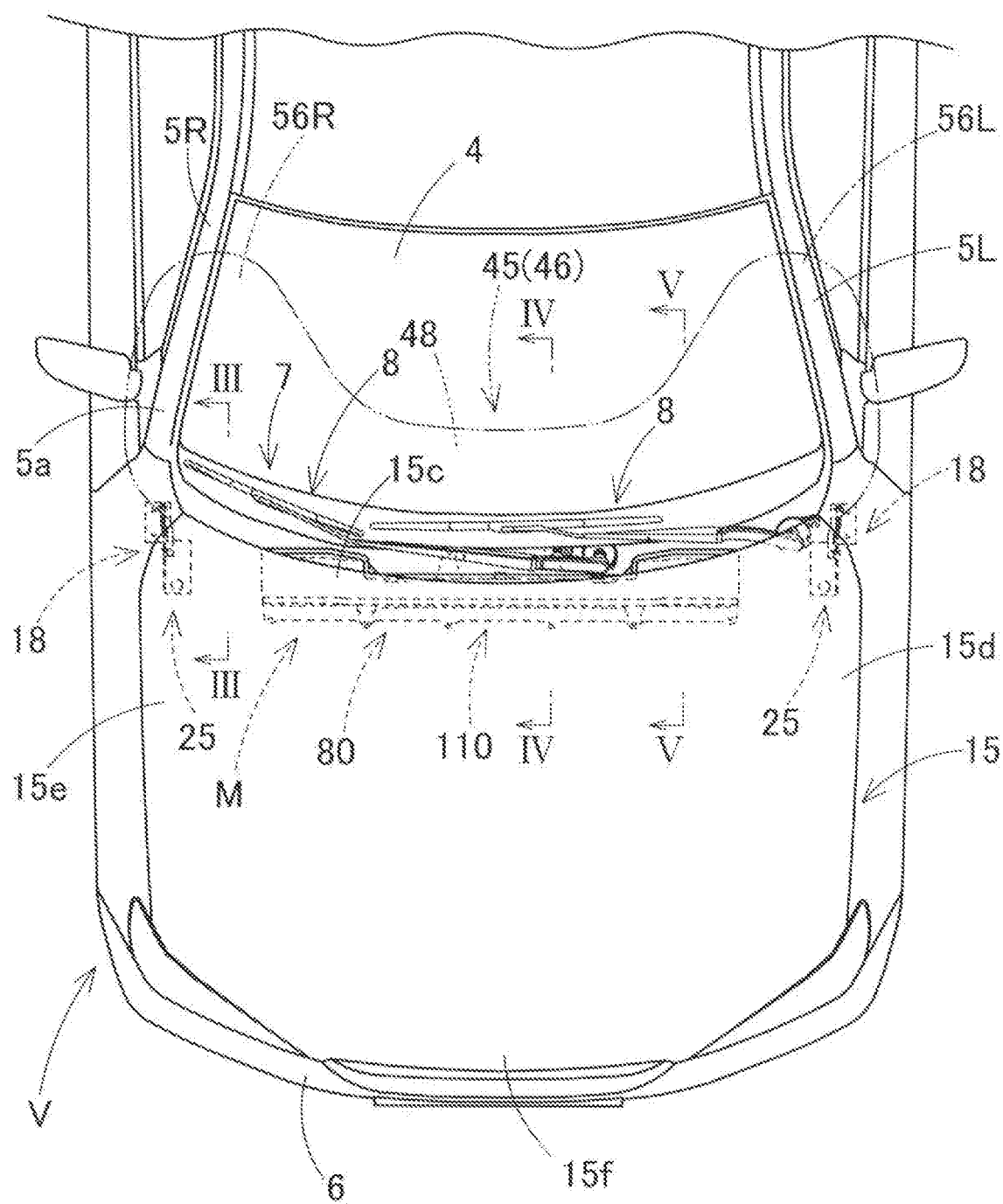
FIG. 1 is a plan view of a vehicle equipped with an airbag device for pedestrian protection embodying the invention.

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

The airbag device M for pedestrian protection which embodies the invention is disposed proximate to the rear end 15c of a hood 15 of a vehicle V, as shown in FIGS. 1 and 3 to 5. More particularly, the airbag device M is located immediately beneath the rear end 15c of the hood 15, at a vicinity of the center in a left and right direction (i.e. in a width direction) of the vehicle V between left and right front pillars 5L and 5R. The airbag device M of the illustrated embodiment is designed to cooperate with a hood lifting device 25 that lifts the rear end 15c of the hood 15. Unless otherwise specified, front/rear, up/down and left/right directions in this specification are intended to refer to front/rear, up/down and left/right directions of the vehicle V.

The vehicle V is provided, inside the front bumper 6 (FIG. 1), with a not-shown sensor for detecting an impact against a pedestrian. The vehicle V is also provided with a not-shown actuating circuit which is connected with the sensor and is designed to actuate an inflator 35 of the airbag device M in response to a signal fed from the sensor that has detected an impact against a pedestrian. When an impact is detected, the actuating circuit also actuates later-described actuators 28 of the hood lifting device 25 generally simultaneously such that the actuators 28 lift the rear end 15c of the hood 15 (FIGS. 27 and 28) in order that a clearance is formed between the rear end 15c of the hood 15 and a cowl 7 for allowing airbag emergence.

As shown in FIG. 1, the hood 15 covers an engine room of the vehicle V and is joined to the body structure 1 of the vehicle V with hinge sections 18 in such a manner as to be openable forward. The hinge sections 18 are located at the left edge 15d and right edge 15e of the rear end 15c region of the hood 15. The hood 15 of the illustrated embodiment is fabricated of plate material or the like of steel or aluminum (aluminum alloy), and is composed of an outer panel 15a, which forms a top face, and an inner panel 15b, which forms a lower face and is enhanced in strength relative to the outer panel 15a, as shown in FIGS. 2 to 5. As shown in FIG. 1, in order to fit a later-described front windshield 4, the rear end 15c of the hood 15 is so designed in shape as to curve with respect to a left and right direction such that the center in a left and right direction is located forward whereas left and right end regions are located rearward.

Figure 2:
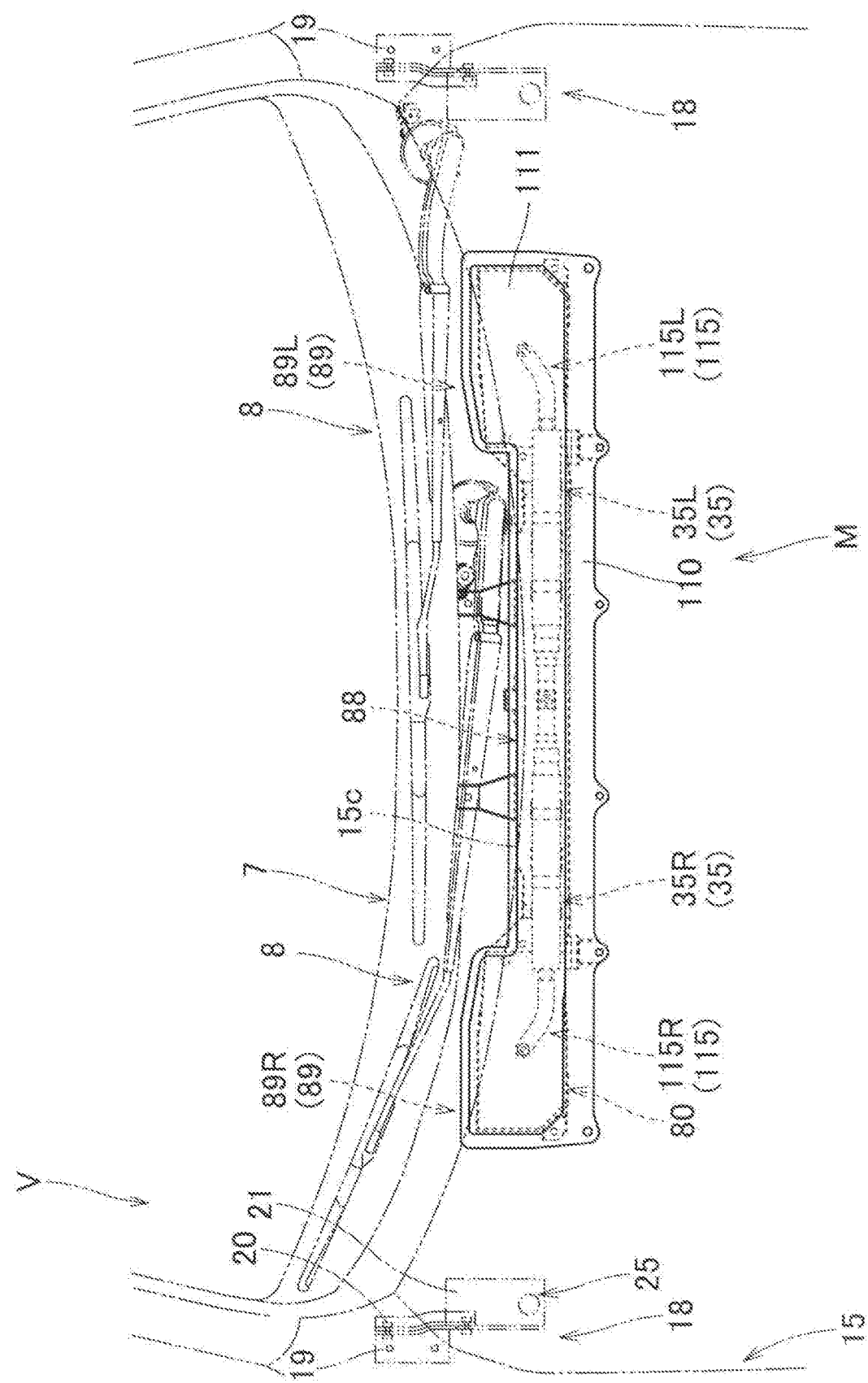
FIG. 2 is a plan view of the airbag device of FIG. 1.
Figure 4:
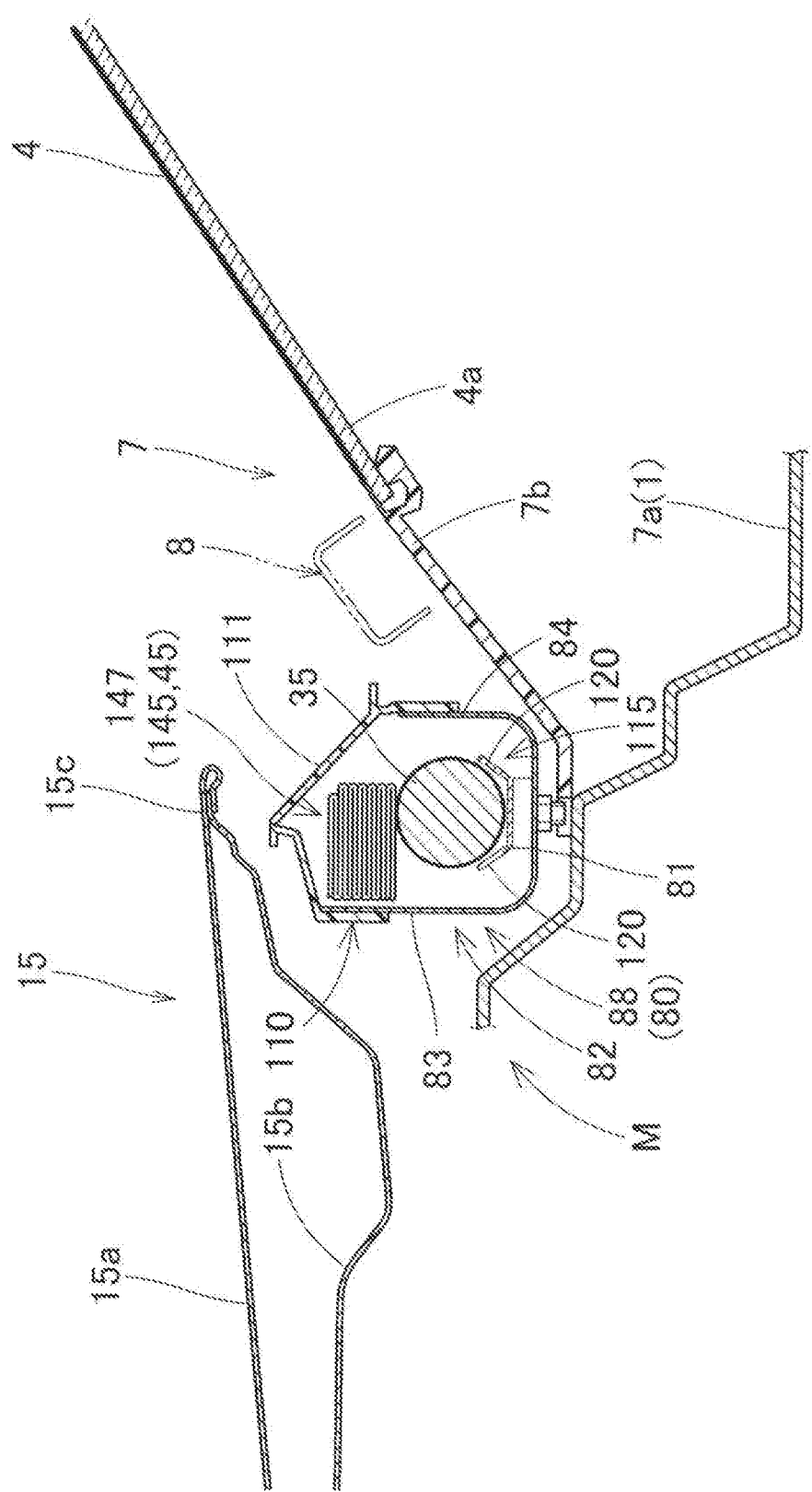
FIG. 4 is a schematic vertical sectional view taken along line IV-IV of FIG. 1.
Figure 5:
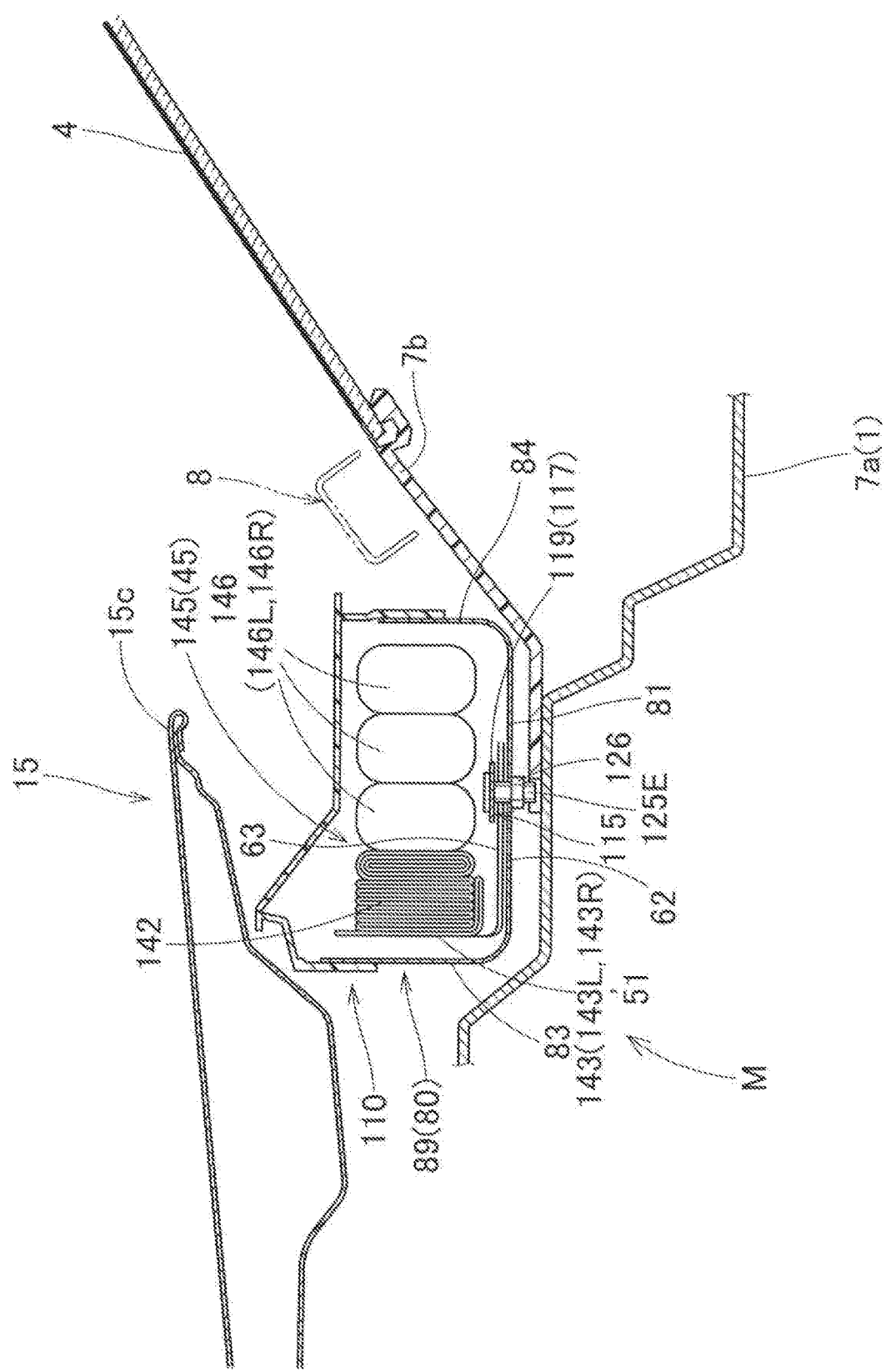
FIG. 5 is a schematic vertical sectional view taken along line V-V of FIG. 1.
Figure 27:
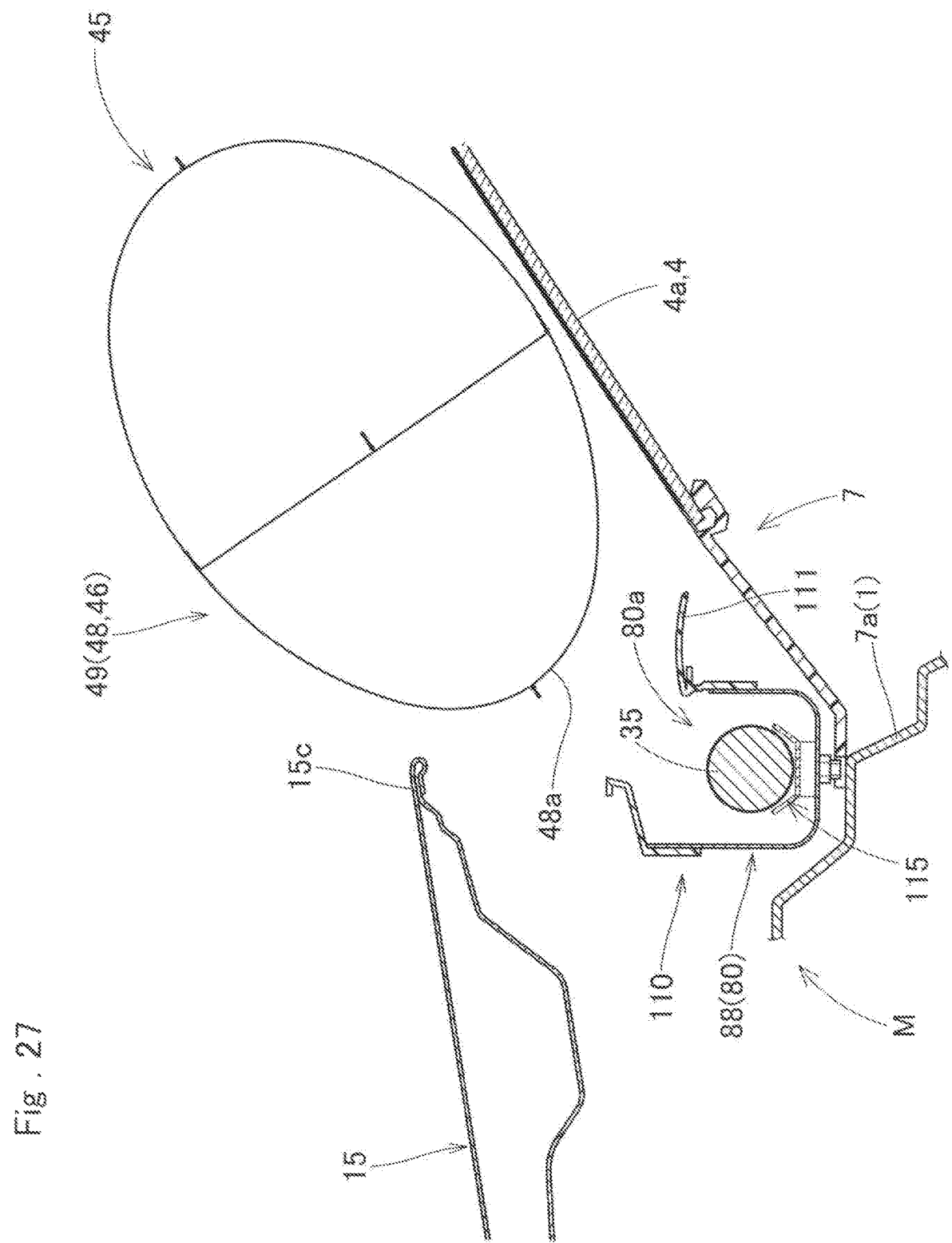
FIG. 27 is a schematic vertical sectional view of the airbag device as has completed deployment of the airbag, taken at the location of the inflator.

As shown in FIGS. 4 and 5, there is disposed a cowl 7 at the rear of and beneath the hood 15. The cowl 7 is composed of a cowl panel 7a which has high rigidity and belongs to the vehicle body structure 1, and a cowl louver 7b which is disposed above the cowl panel 7a and is fabricated of synthetic resin. The cowl louver 7b is continuous with a lower region 4a of the front windshield 4 at the rear end. The cowl 7 is also shaped along the curvature of the rear end 15c of the hood 15 to curve relative to a left and right direction such that the central region in a left and right direction is located forward whereas the left and right end regions are located rearward (FIG. 1). As shown in FIGS. 1 and 2, a pair of wipers 8 are disposed on the cowl 7. As indicated with double-dotted lines in FIGS. 4 and 5, the wipers 8 are so disposed as to protrude upward from the cowl louver 7b. The front pillars 5L and 5R are located on the left and right of the front windshield 4, as shown in FIG. 1. Although the hood 15 is pushed up at the rear end 15c as shown in FIGS. 27 and 28 when the hood lifting device 25 is actuated, the front end 15f of the hood 15 stays engaged with the vehicle body structure 1 since a latch mechanism holds a normally-closing hood lock striker at the front end 15f.

Figure 3:
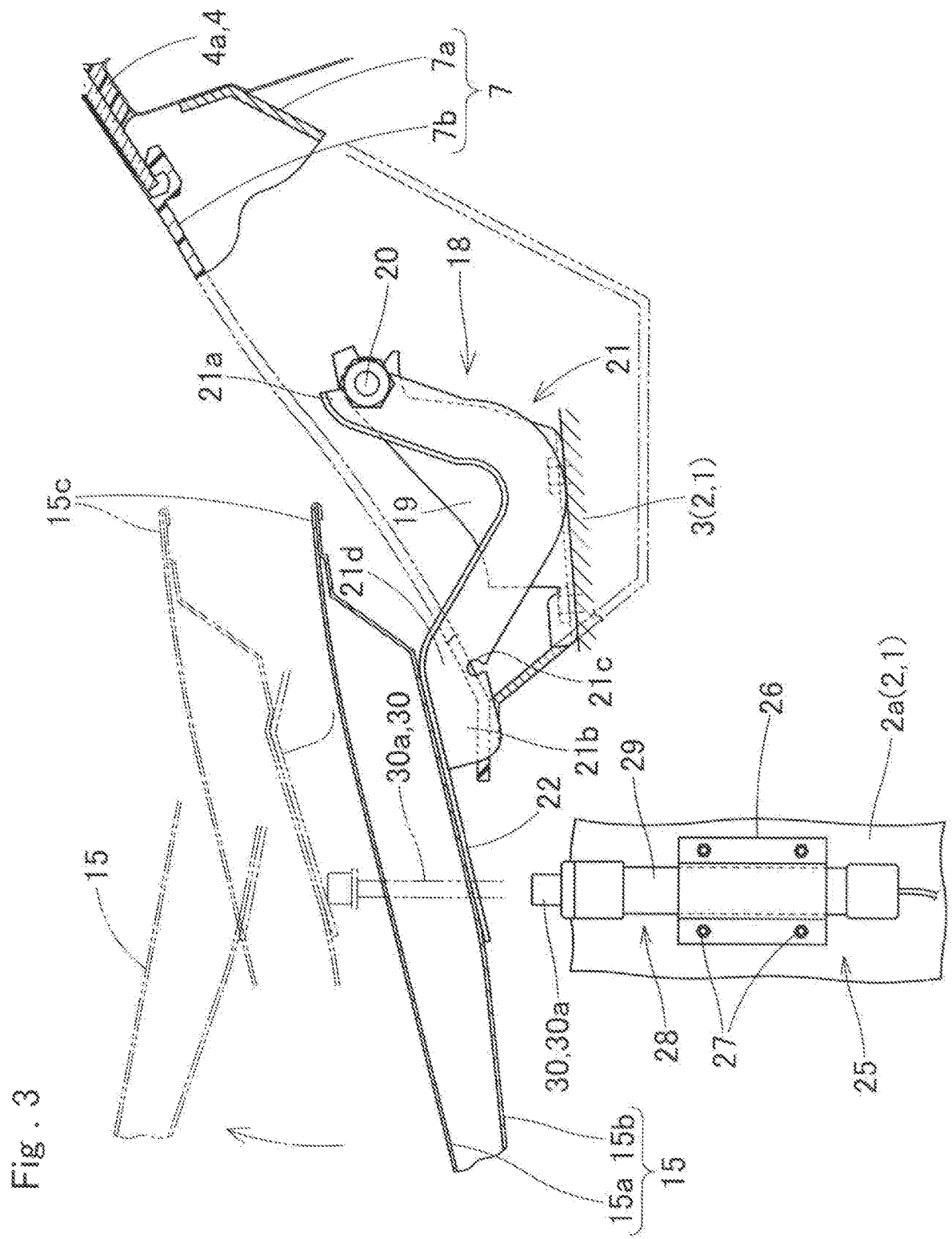
FIG. 3 is a schematic vertical sectional view taken along line III-Ill of FIG. 1 for showing a hood lifting device.

The hinge sections 18 are disposed at the left edge 15d and right edge 15e of the rear end 15c of the hood 15 (FIGS. 1 and 2). Each of the hinge sections 18 is provided with a hinge base 19 and a hinge arm 21. As shown in FIGS. 1 to 3, the hinge arm 21 is secured to the hood 15, and the hinge base 19 is secured to a mounting flange 3 which is jointed to a hood ridge reinforcement 2, which is part of the vehicle body structure 1. As shown in FIG. 3, the hinge arm 21 is formed of an angle material of sheet metal shaped into a generally semicircular arc protruding downwardly. The root end 21a of the hinge arm 21 is rotatably joined to the hinge base 19 with the aid of a support shaft 20. As shown in FIG. 3, the hinge arm 21 includes, at the leading end 21b located away from the root end 21a, a joint plate 22 which extends from the leading end 21b generally along the underside of the hood 15. The joint plate 22 is jointed to the underside of the rear end 15c of the hood 15 by welding or the like. As shown in FIG. 3, a generally round cavity 21c is formed on the lower edge in a vicinity of the leading end 21b of the hinge arm 21. The region around the cavity 21c serves as a plastically deformable portion 21d that is to plastically deform for allowing the rise of the rear end 15c of the hood 15 when a piston rod 30 of the actuator 28 of the hood lifting device 25 pushes up the rear end 15c of the hood 15 (FIGS. 27 and 28), though not described in detail in this specification. As shown in FIGS. 2 and 3, the support shaft 20 of each of the hinge sections 18 extends along a left and right direction of the vehicle V. As indicated by double-dotted lines in FIG. 3, the hood 15 can be opened forward around the support shafts 20 by lifting the front end 15f (FIG. 1) of the hood 15.

As shown in FIGS. 1 to 3, the hood lifting device 25 is located on the left and right of the airbag device M, beneath the hinge sections 18 and below the left edge 15d and rear edge 15e of the rear end 15c of the hood 15. As shown in FIG. 3, the hood lifting device 25 includes, in each of the left and right sections, an actuator 28 and a mounting bracket 26 for mounting the actuator 28 on the hood ridge reinforcement 2 (i.e. on the vehicle body structure 1). The mounting bracket 26 has a generally U-shaped sectional shape for holding the actuator 28 and is bolt 27 fastened to a mounting flange 2a provided on the hood ridge reinforcement 2. Each of the actuators 28 includes a not-shown gas generator as the driving force, a cylinder 29 held by the mounting bracket 26 and a piston rod 30 stored inside the cylinder 29 for upward deployment out of the cylinder 29. The gas generator is stored at the bottom of the cylinder 29. The actuator 28 is so designed that the piston rod 30 as well as its piston (not shown) are pushed up with a gas that the gas generator generates. If the actuators 28 of the hood lifting device 25 are actuated, the tops 30a of the piston rods 30 abut against the underside of the rear end 15c of the hood 15 and lift the rear end 15c of the hood 15 as shown in FIGS. 27 and 28, thereby forming a clearance between the cowl 7 and the rear end 15c of the hood 15 for allowing airbag emergence.

Referring to FIGS. 2, 4 and 5, the airbag device M includes an airbag 45, an inflator 35 that feeds an inflation gas to the airbag 45, a case or housing 80 that houses the airbag 45 and inflator 35, an airbag cover 110 for covering the airbag 45, and a mounting bracket 115 that mounts the inflator 35 and airbag 45 on the case 80.

Figure 6:
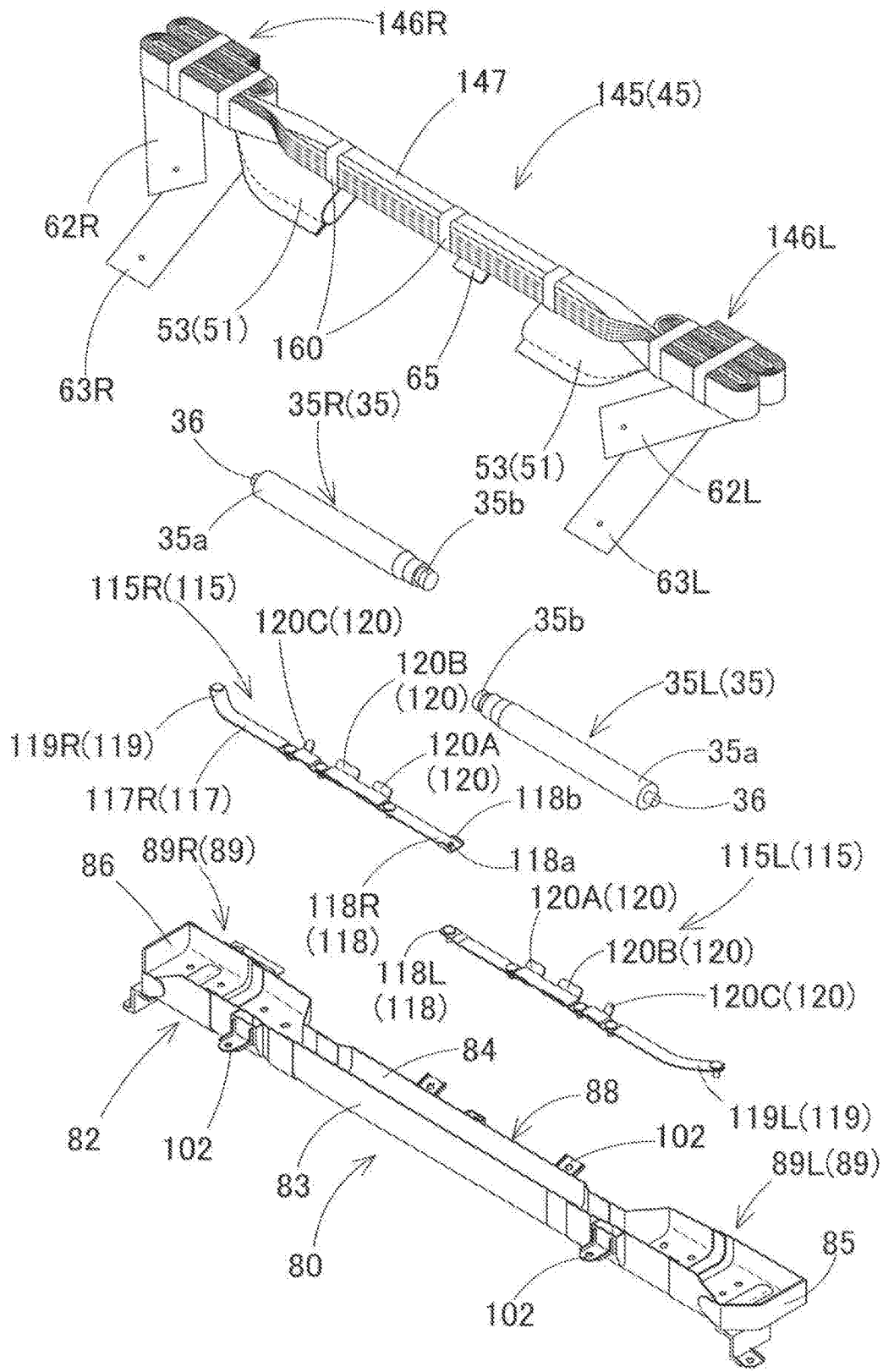
FIG. 6 is a schematic exploded perspective view of the airbag device showing a case, an airbag, inflators and mounting brackets.
Figure 16:
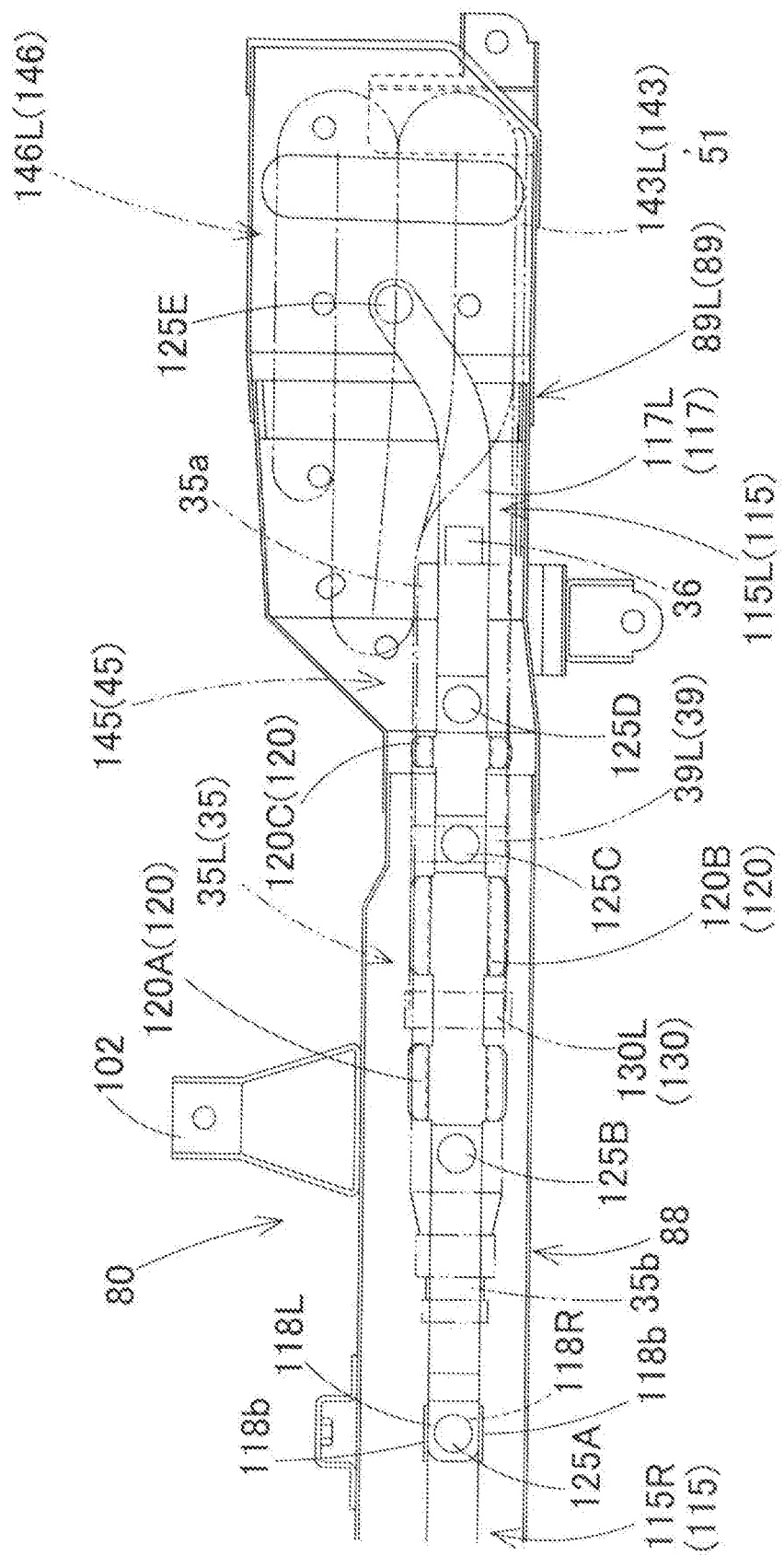
FIG. 16 is a partial enlarged plan view illustrating the way the mounting bracket is placed on the bottom wall of the case.
Figure 17:
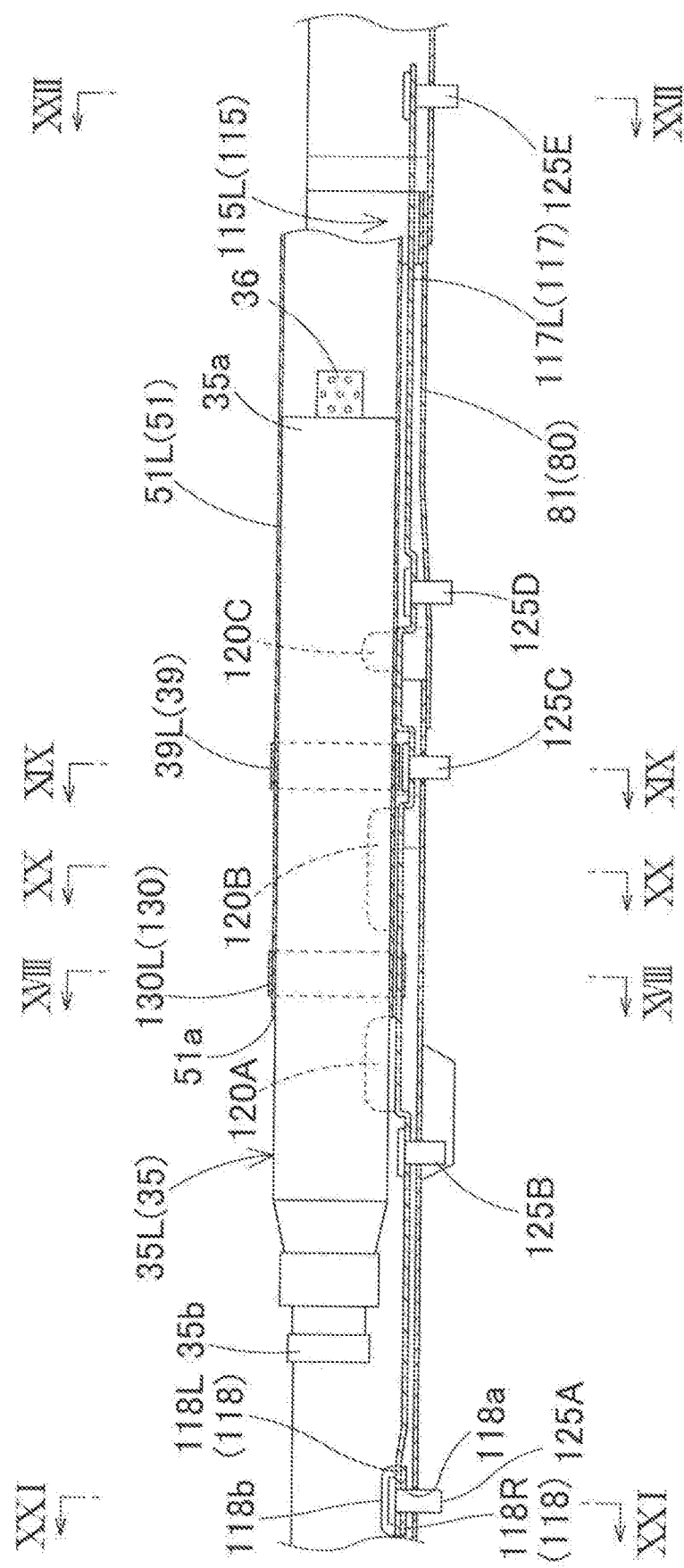
FIG. 17 is a partial enlarged sectional view taken along a left and right direction, illustrating the way the airbag and inflator are mounted on the case with the aid of the mounting bracket.
Figure 18:
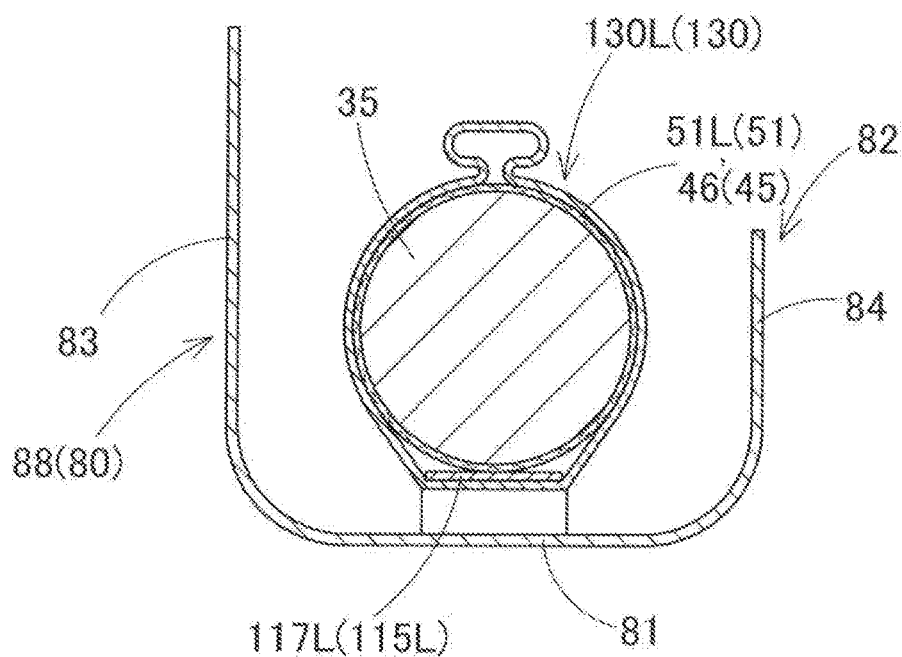
FIG. 18 is a sectional view taken along line XVIII-XVIII of FIG. 17.
Figure 19:
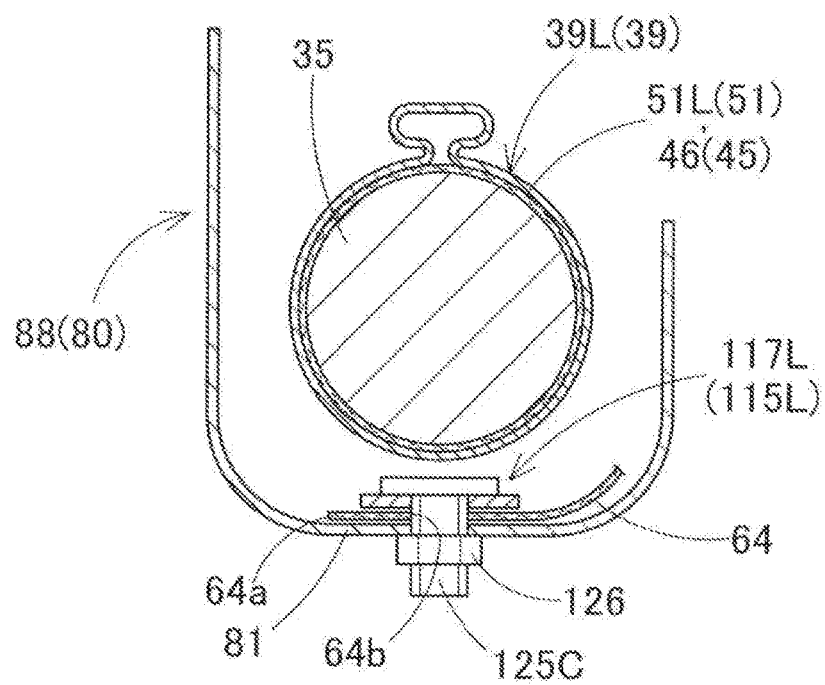
FIG. 19 is a sectional view taken along line XIX-XIX of FIG. 17.

As shown in FIGS. 2 and 6, the airbag device M of the illustrated embodiment includes two inflators 35 (35L and 35R) disposed spaced-apart in a left and right direction. Each of the inflators 35 is generally cylindrical in outer contour and so arranged that the axial direction extends along the left and right direction. Each of the inflators 35 includes a gas releasing region 36 for discharging an inflation gas at the first end (or leading end) 35a in the axial direction. The second end (or root end) 35b of each of the inflators 35 is electrically connected to the actuating circuit through a not-shown lead wire. As shown in FIG. 2, the inflators 35L and 35R are adapted to be mounted on the vehicle V such that the leading ends 35a with the gas releasing region 36 face away from each other. As shown in FIGS. 17 to 19, the leading end 35a region of each of the inflators 35 (35L and 35R) is inserted into and connected with a later-described inlet port section 51 (51L/51R) of the airbag 45 through the use of two clamps 39 and 130 which are mounted around the inlet port section 51. As described later, each of the inflators 35 (35L and 35R) is stored in the case 80 in such a manner as to extend over a later-described central region 88 and end region 89 (89L/89R) of the case 80 such that the leading end 35a (or the gas releasing region 36) is located within an area of the end region 89 (89L/89R), as indicated with double-dotted lines in FIG. 16.

Referring to FIGS. 7 to 10, the airbag 45 includes a bag body 46 which is inflatable with an inflation gas, and mounting belts 62, 63, 64 and 65 which are used to mount the bag body 46 on the case 80.

The bag body 46 is designed to be inflated into a generally U shape elongated in a left and right direction, as viewed from the front. The bag body 46 includes a transverse inflatable portion 48 that is deployable generally along a left and right direction and covers the cowl 7 (more particularly, cowl louver 7b), a pair of vertical inflatable portions 56L and 56R that extend rearward from left and right ends of the transverse inflatable portion 48 and cover the lower regions 5a of the front pillars 5L and 5R, and a pair of inlet port sections 51 (51L and 51R) which are disposed in a vicinity of the front end of the transverse inflatable portion 48 for connection with the inflators 35L and 35R. In the illustrated embodiment, the bag body 46 includes a pedestrian-side wall 46b deployable on the upper side and a vehicle-side wall 46a deployable on the lower side and opposed to the pedestrian-side wall 46b. The pedestrian-side wall 46b and vehicle-side wall 46a are generally identical in outer contour, and the bag body 46 is formed by joining (sewing) the outer circumferential edges of the pedestrian-side wall 46a and vehicle-side wall 46b together except openings 51a of the inlet port sections 51 (51L and 51R).

Figure 26:
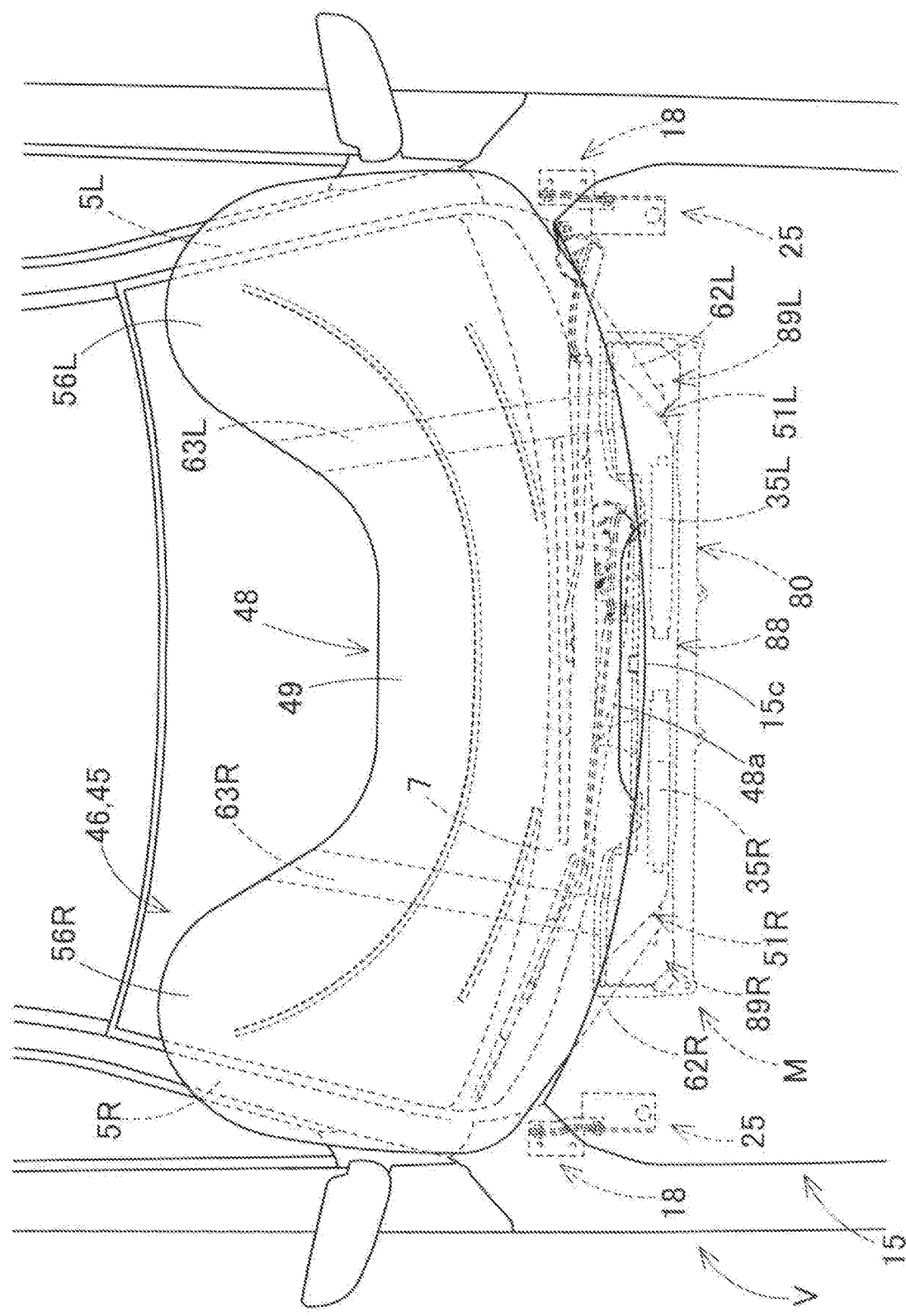
FIG. 26 is a schematic plan view of the airbag device of the embodiment as has completed deployment of the airbag.

The transverse inflatable portion 48 is designed to protrude from the case (housing) 80 and deploy generally along the vehicle width direction (i.e. along the left and right direction), over a generally whole area in the vehicle width direction (i.e. in the front and rear direction) of the cowl 7 at airbag deployment. More specifically, as shown in FIGS. 26 and 27, the transverse inflatable portion 48 is designed to deploy over the cowl 7 and a lower region 4a of the front windshield 4 such that the front edge 48a is deployed proximate to the rear end 15c of the hood 15.

Figure 7:
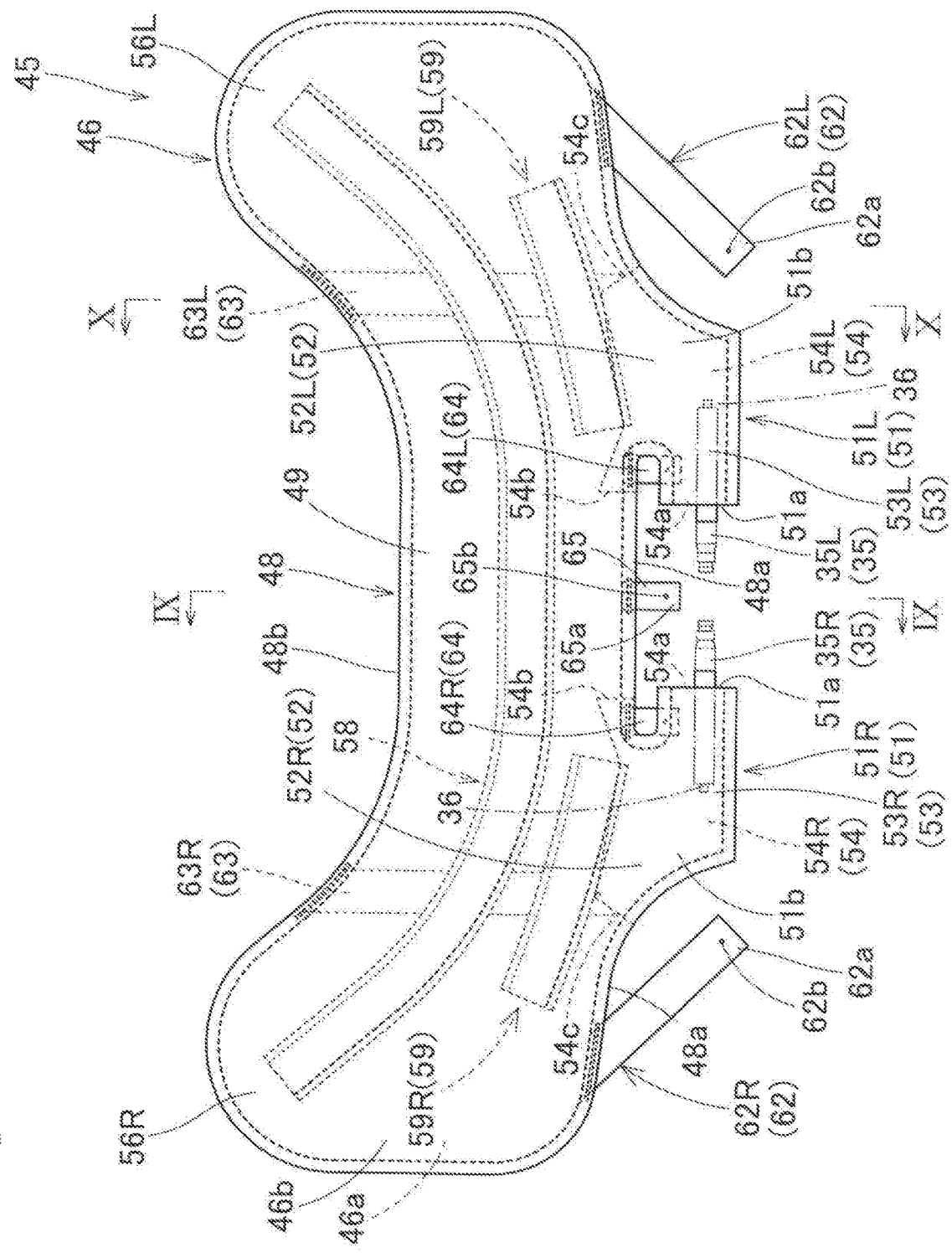
FIG. 7 is a plan view of an airbag used in the airbag device of the embodiment as unfolded.

As shown in FIGS. 6 and 7, each of the inlet port sections 51 (51L and 51R) is formed in such a manner as to protrude forward from a vicinity of the front edge 48a of the transverse inflatable portion 48 in the bag body 46 as unfolded and flattened. The inlet port sections 51 (51L and 51R) are coupled with the inflators 35L and 35R for taking in an inflation gas. Specifically, the inlet port sections 51L and 51R are disposed at farther inward positions in a left and right direction than the vertical inflatable portions 56L and 56R. Each of the inlet port sections 51L and 51R is formed into such a bent shape that extends forward from the front edge 48a of the transverse inflatable portion 48 and then bends inward, such that the inlet openings 51a formed at the leading end face each other in a left and right direction.

Each of the inlet port sections 51L and 51R includes a root region 52 (52L/52R) which is disposed towards the transverse inflatable portion 48 and a leading end region 53 (53L/53R) disposed away from the transverse inflatable portion 48. Each of the inlet port sections 51L and 51R is designed to be inflated into such a generally tube that extends generally along a left and right direction (i.e. width direction of the vehicle). Each of the leading end regions 53 is so formed that the inner end in the left and right direction is open while the outer end in the left and right direction is closed. More specifically, each of the inlet port sections 51 (51L, 51R) protrudes forward from the front edge 48a of an area of the transverse inflatable portion 48 which is disposed on the inner side in the left and right direction of the vertical inflatable portion 56L/56R and adjoins the vertical inflatable portion 56L/56R. As shown in FIG. 26, the inlet port sections 51 (51L and 51R) are designed to be disposed at such positions as to generally correspond to later-described end regions 89 (89L and 89R) of the case 80, as viewed from above, when the airbag device M as mounted on board is actuated. As viewed from the side, the leading end regions 53L and 53R are to remain inside the case 80 while the root regions 52L and 52R are to be deployed outside of a later-described emergence opening 80a of the case 80 and between the case 80 and rear end 15c of the hood 15 at airbag deployment, as shown in FIG. 28. Further, a central region 49 of the transverse inflatable portion 48, which is disposed generally at the center in the left and right direction of the transverse inflatable portion 48 where no inlet port sections 51 are disposed at the front, is designed to be deployed at the rear of the hood 15, not beneath the hood 15, as shown in FIG. 27.

Figure 10:
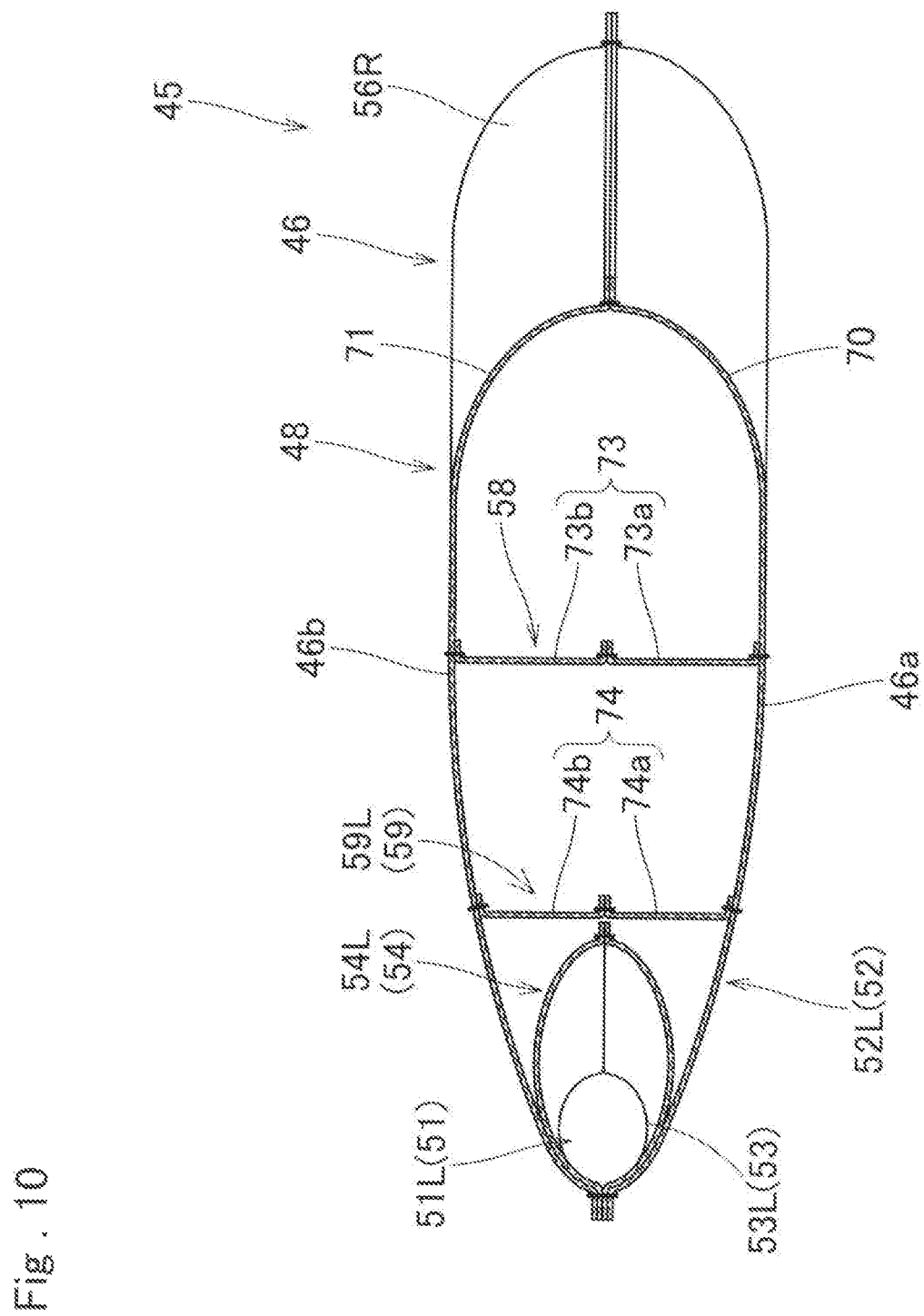
FIG. 10 is a sectional view of the airbag of FIG. 7 as inflated by itself, taken along line X-X of FIG. 7.
Figure 11:
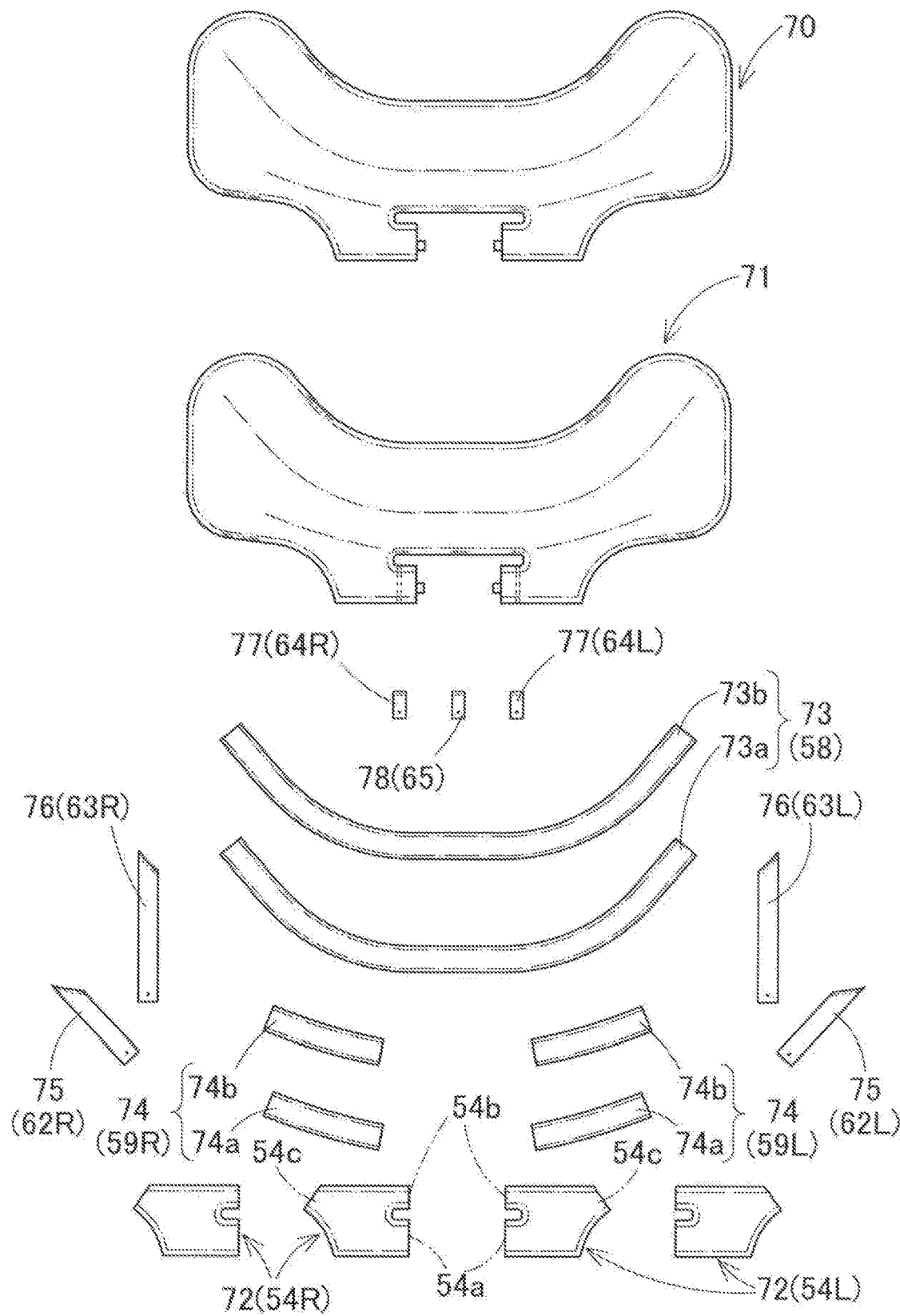
FIG. 11 shows base materials of the airbag in plan views.

As shown in FIGS. 7 and 10, inside the inlet port sections 51L and 51R are disposed inner tubes 54 (54L and 54R) which enhance heat resistance of the inlet port sections 51 and redirect the inflation gas G toward the left and right. As shown in FIGS. 7 and 11, each of the inner tubes 54 is formed into a trifurcate contour and includes an opening 54a disposed proximate the inlet opening 51a of the inlet port section 51, an opening 54b disposed inside the transverse inflatable portion 48 and facing towards the center in a left and right direction of the airbag 45 and an opening 54c disposed inside the transverse inflatable portion 48 and facing outwardly in the left and right direction of the airbag 45. The inner tubes 54 prevent the inflation gas G which has flown in via the inlet port sections 51 from flowing rearward directly and redirect the gas G towards the left and right.

Figure 8:
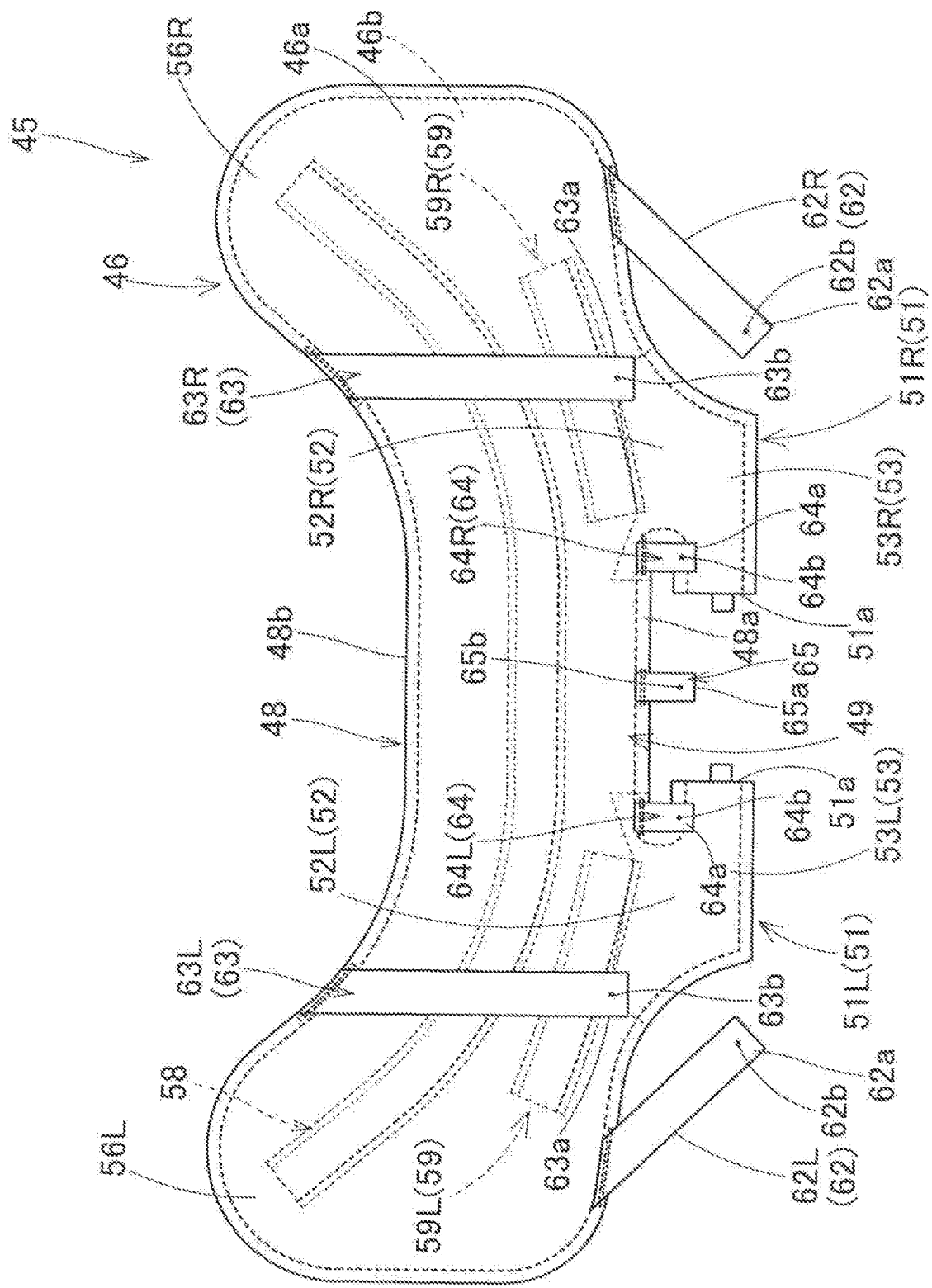
FIG. 8 is a bottom view of the airbag of FIG. 7.
Figure 9:
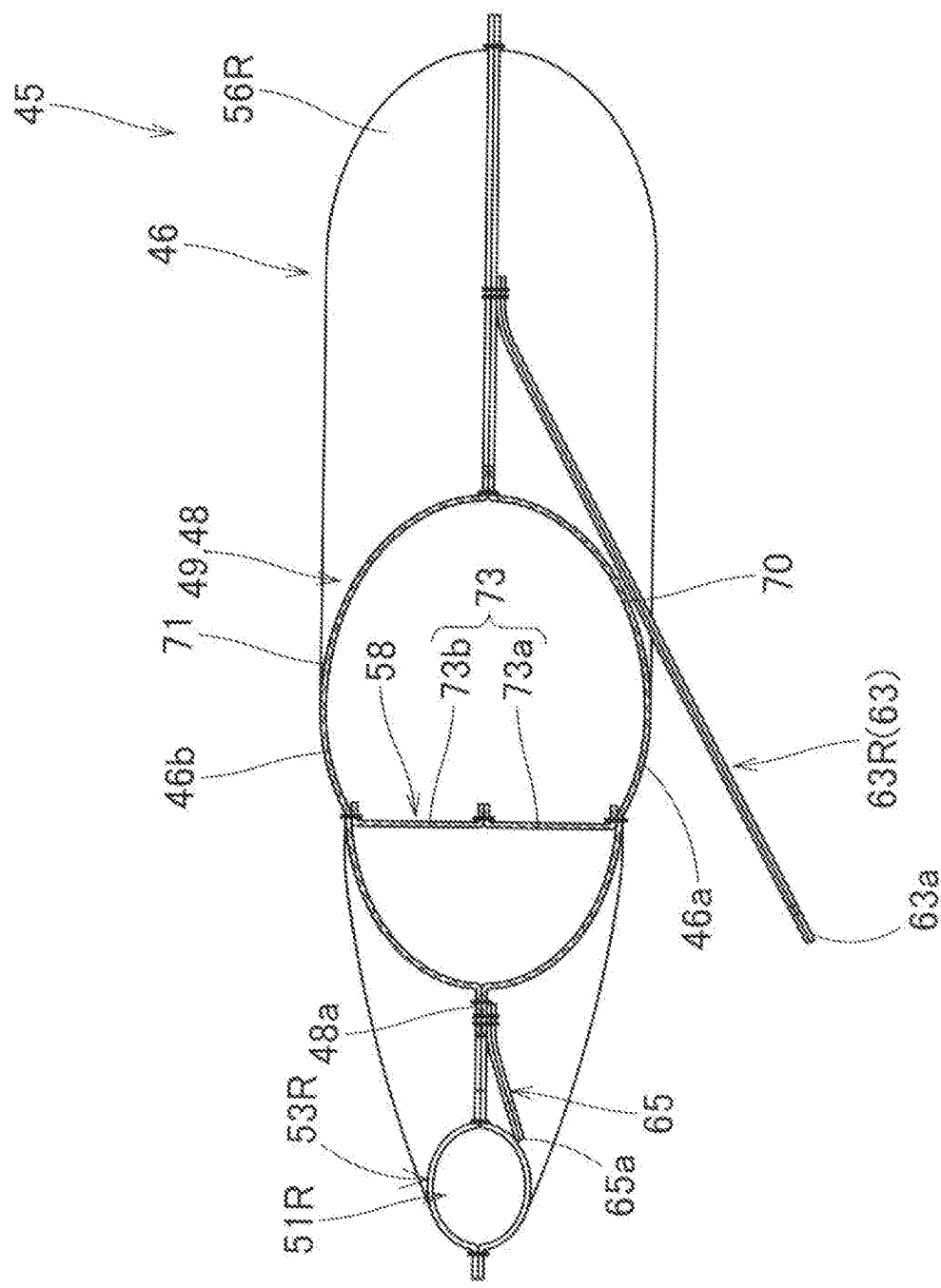
FIG. 9 is a sectional view of the airbag of FIG. 7 as inflated by itself, taken along line IX-IX of FIG. 7.

Referring to FIGS. 7 to 10, the bag body 46 internally includes a center tether 58 and a pair of side tethers 59 (59L and 59R) each of which connects the pedestrian-side wall 46b and vehicle-side wall 46a and limits the clearance between the pedestrian-side wall 46b and vehicle-side wall 46a at airbag deployment. The center tether 58 is disposed across the transverse inflatable portion 48 and left and right vertical inflatable portions 56L and 56R. The center tether 58 is arranged in such a manner as to curve gently generally along the rear edge of the bag body 46 as flattened, generally at the center in a front and rear direction of the transverse inflatable portion 48. As shown in FIGS. 9 to 11, the center tether 58 is composed of two pieces of base cloths 73, i.e. a vehicle-side member 73a disposed towards the vehicle-side wall 46a and a pedestrian-side member 73b disposed towards the pedestrian-side wall 46b. Each of the side tethers 59 (59L and 59R) is disposed in a vicinity of the front edge 48a of the transverse inflatable portion 48 and at the rear of the inlet port section 51L/51R. Each of the side tethers 59 (59L and 59R) is arranged at an angle to the left and right direction such that the inner end is located farther forward than the outer end, so as to be generally in parallel to the center tether 58. The side tethers 59L and 59R are formed into generally bilaterally symmetrical contour. As shown in FIGS. 10 and 11, each of the side tethers 59L and 59R is composed of two pieces of base cloths 74, i.e. a vehicle-side member 74a disposed towards the vehicle-side wall 46a and a pedestrian-side member 74b disposed towards the pedestrian-side wall 46b.

Figure 21:
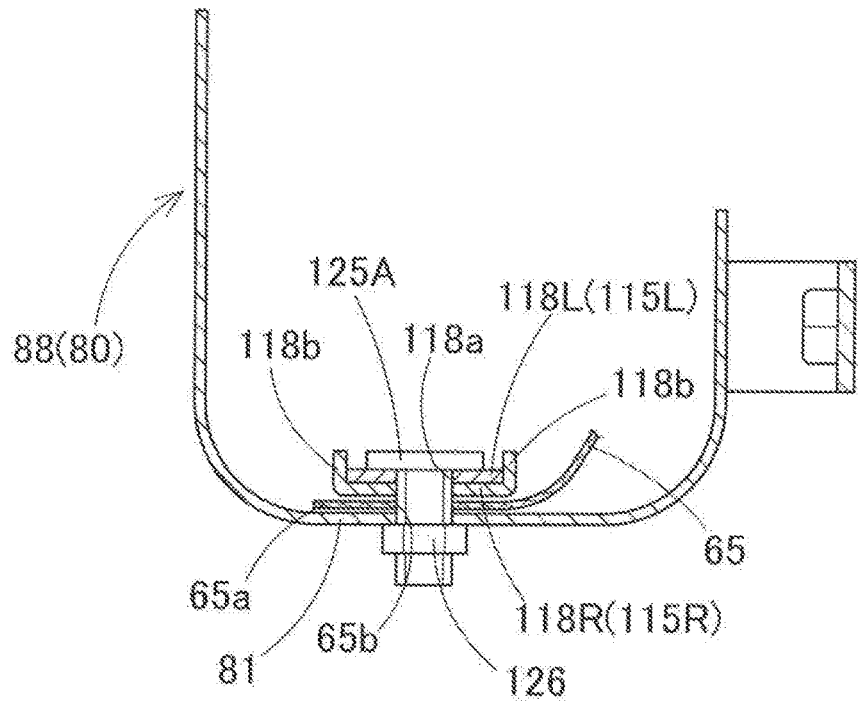
FIG. 21 is a sectional view taken along line XXI-XXI of FIG. 17.
Figure 22:
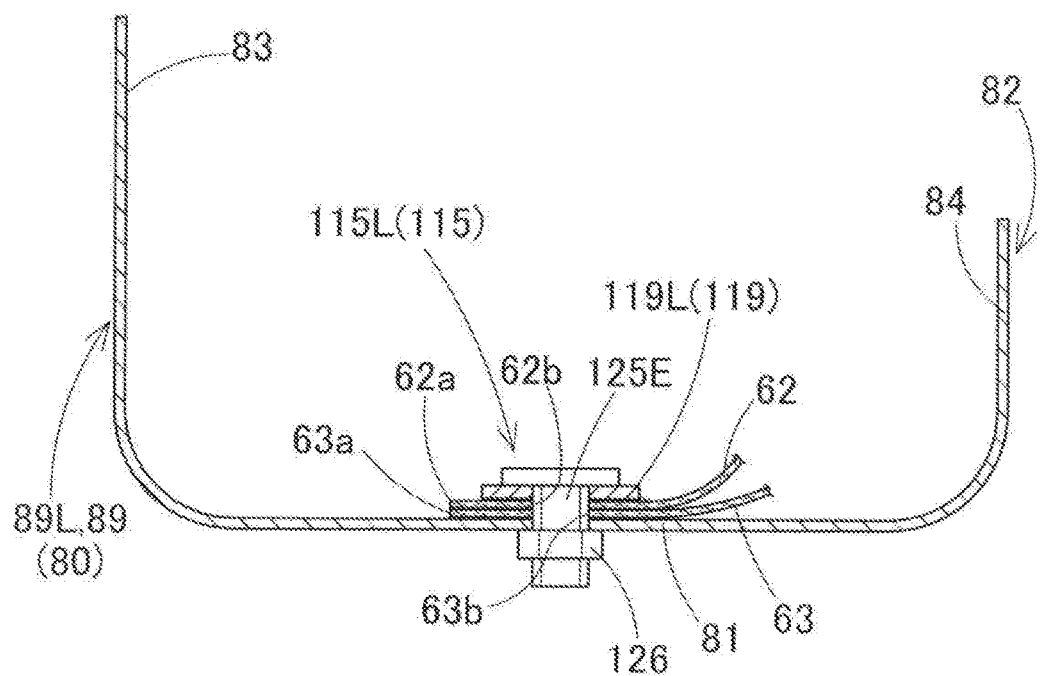
FIG. 22 is a sectional view taken along line XXII-XXII of FIG. 17.

Referring to FIGS. 7 and 8, each pair of the mounting belts 62 (62L and 62R), 63 (63L and 63R), 64 (64L and 64R) and mounting belt 65 is disposed at generally bilaterally symmetrical positions on the bag body 46 and extend from either the front edge 48a or rear edge 48b of the transverse inflatable portion 48. The leading ends 62a, 63a, 64a and 65a of the mounting belts 62, 63, 64 and 65 are adapted to be anchored to the case 80 or its vicinity through the use of the mounting brackets 115 (115L and 115R), as shown in FIGS. 19, 21 and 22. Specifically, as shown in FIGS. 7 and 8, the mounting belts 62L and 62R extend from left and right end regions of the front edge 48a of the transverse inflatable portion 48 (i.e. from the areas in front of the vertical inflatable portions 56L and 56R) such that the leading end regions 62a face towards the center in the left and right direction. Each of the mounting belts 62L and 62R is provided, at the leading end region 62a, with a mounting hole 62b for receiving a later-described bolt 125E of the mounting bracket 115, as shown in FIG. 22. The mounting belts 62L and 62R help prevent the left and right end regions of the transverse inflatable portion 48 from protruding upward in an undue fashion at airbag deployment. As shown in FIGS. 7 and 8, the mounting belts 63L and 63R extend forward from a vicinity of the boundary between the transverse inflatable portion 48 and the vertical inflatable portions 56L and 56R in the rear edge 48b of the transverse inflatable portion 48. In the leading end region 63a of each of the mounting belts 63L and 63R, there is provided a mounting hole 63*b* for receiving the bolt 125E of the mounting bracket 115 (FIG. 22). That is, the mounting belts 62 (62L, 62R) and 63 (63L, 63R) are designed to be anchored to the same position on the case 80 with the same mounting bolt 125E, as shown in FIG. 22. The mounting belts 63L and 63R help prevent the rear edge 48*b* region of the transverse inflatable portion 48 from protruding upward in an undue fashion at airbag deployment. Each of the mounting belts 64L and 64R extends from the front edge 48*a* of the transverse inflatable portion 48 at a vicinity of an inner region of the inlet port section 51L/51R. In the leading end region 64*a* of each of the mounting belts 64L and 64R, there is provided a mounting hole 64*b* for receiving a bolt 125C of the mounting bracket 115, as shown in FIG. 19. The mounting belt 65 extends forward generally from the center in the left and right direction of the front edge 48*a* of the transverse inflatable portion 48, and is provided with a mounting hole 65*b* for receiving a bolt 125A of the mounting bracket 115L, at the leading end region 65*a*, as shown in FIG. 21. The mounting belts 64L, 64R and 65 help limit a clearance between the front edge 48*a* of the transverse inflatable portion 48 and the bottom wall 81 of the case 80 at airbag deployment in order to prevent the transverse inflatable portion 48, especially the central region 49 of the transverse inflatable portion 48, from floating from the case 80 too much.

As shown in FIG. 11, the airbag 45 is composed of a vehicle-side base cloth 70 for forming the vehicle-side wall 46*a*, a pedestrian-side base cloth 71 for forming the pedestrian-side wall 46*b*, four base cloths 72 for forming the inner tubes 54, two base cloths 73 for forming the center tether 58, four base cloths 74 for forming the side tethers 59 and base cloths 75, 76, 77 and 78 for forming the mounting belts 62, 63, 64 and 65. Each of these base cloths (or materials) is fabricated of a woven fabric of polyamide yarn, polyester yarn or the like, and provided in a predetermined cut shape. Each of the base cloths is coated with a suitable coating agent for preventing gas leakage.

Figure 12:
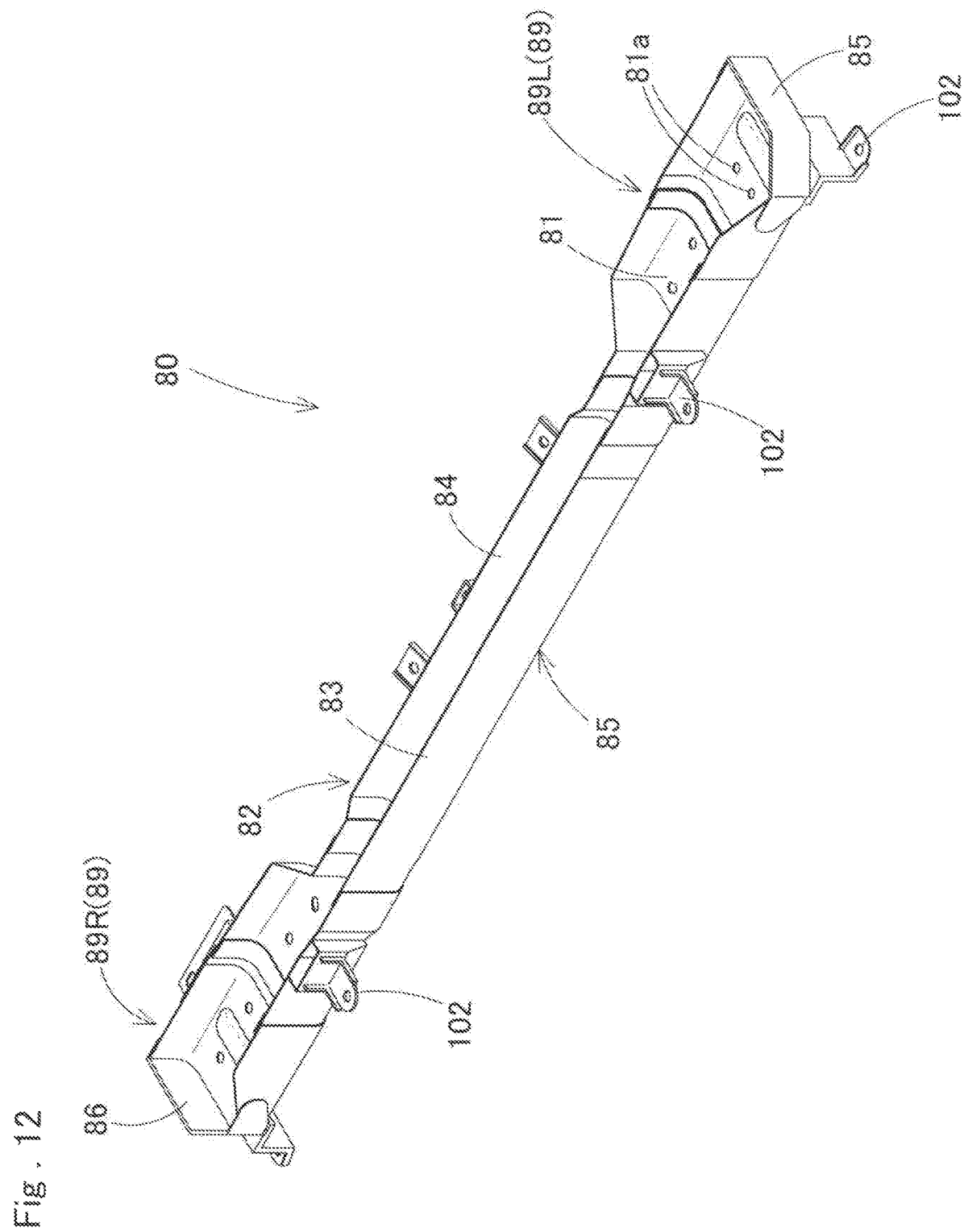
FIG. 12 is a perspective view of a case used in the airbag device of the embodiment.
Figure 13:
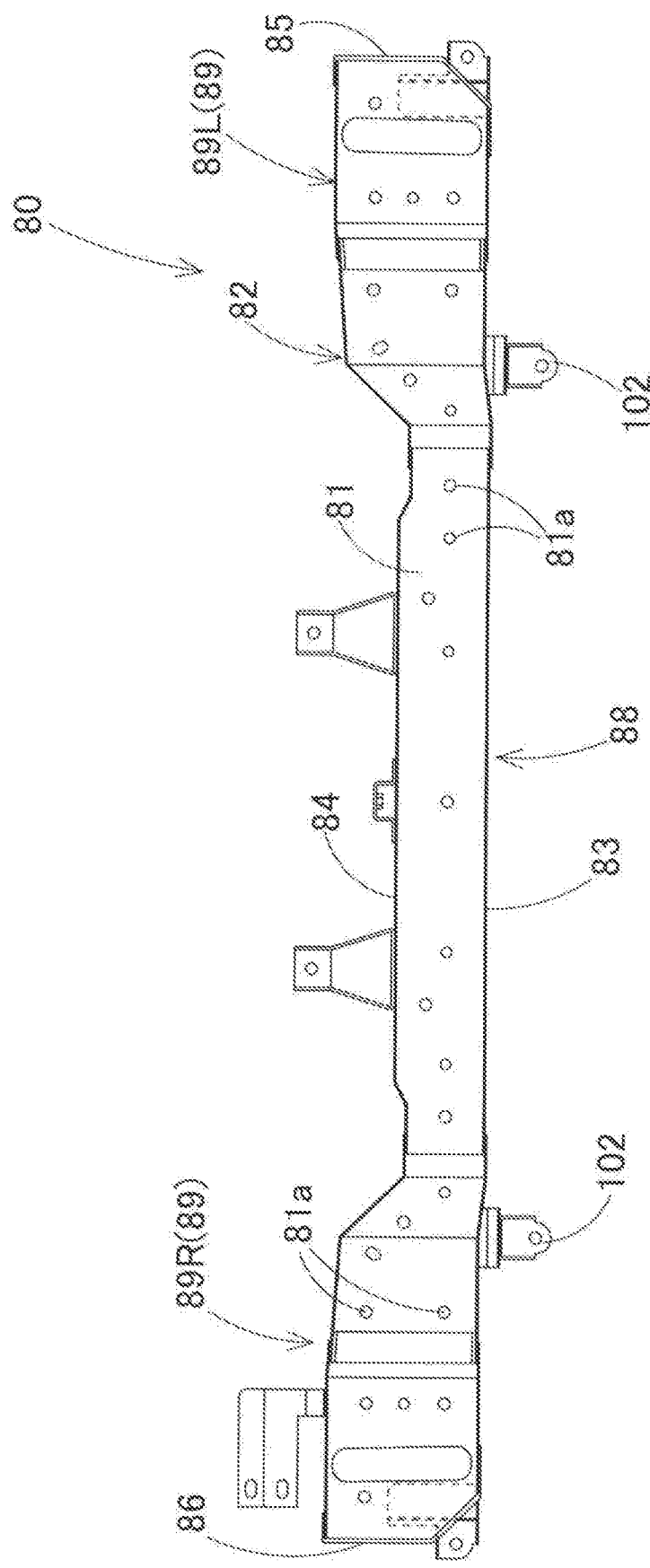
FIG. 13 is a plan view of the case of FIG. 12.

The case 80 is adapted to be disposed immediately below the rear end 15*c* of the hood 15 in such a manner as to extend along a left and right direction of the vehicle V. The case 80 is formed into a generally open-topped box shape elongated in a left and right direction. The case 80 is formed of a sheet metal, and includes a bottom wall 81, a circumferential wall 82 which rises from the circumferential edge of the bottom wall 81, and an emergence opening 80*a* located at the top of the circumferential wall 82, as shown in FIGS. 12 and 13. The airbag 45 and inflators 35 are mounted on the bottom wall 81, and the bottom wall 81 supports the undersides of the inflators 35. The bottom wall 81 is provided with numerous mounting holes 81*a* for receiving the bolts 125 of the mounting brackets 115. As shown in FIG. 16, the mounting holes 81*a* are also formed on positions not receiving the mounting bolts 125. Such holes 81*a* serve as drainage holes for letting out rainwater. The circumferential wall 82 includes a front wall 83 and a rear wall 84 which are opposed in a front and rear direction, and a left wall 85 and a right wall 86 which are opposed in a left and right direction. As shown in FIGS. 18 to 21, in the illustrated embodiment, the rear wall 84 is smaller in width in an up and down direction than the front wall 83 so as to allow smooth deployment of the airbag 45.

As shown in FIGS. 12, 13 and 16, the case 80 has a central region 88 which is disposed in a vicinity of the center in a left and right direction and left and right end regions 89 (89L and 89R) which are disposed in a vicinity of the left and right ends, and the central region 88 is smaller in width in a front and rear direction than each of the left and right end regions 89. More specifically, the rear wall 84 is formed with steps while the front wall 83 is formed generally straight along the left and right direction, thereby the width in the front and rear direction of the central region 88 is differentiated from that of each of the left and right end regions 89. As described later, the airbag 45 is stored in the case 80 in a folded-up configuration. The folded-up configuration of the airbag 45 will hereinafter be called a folded-up body 145. In the illustrated embodiment, the folded-up body 145 includes a central folded-up portion 147 which is positioned generally at the center in the left and right direction, and a pair of bellows-folded portions (or transversely-contracted fold portions) 146L and 146R which are disposed to the left and right ends. When the folded-up body 145 is stored in the case 80, the central folded-up portion 147 is disposed on the inflators 35 in the central region 88 as shown in FIG. 4, and the bellows-folded portions 146L and 146R are each disposed at the rear of the inlet port sections 51L and 51R (or great-width fold portions 143L and 143R) in the end regions 89L and 89R, as shown in FIGS. 5 and 16 (with double-dotted lines, in FIG. 16). The case 80 is further provided with more than one brackets 102 which are adapted to be secured to the cowl panel 7*a* of the vehicle body structure 1, as shown in FIGS. 12 and 13. The brackets 102 extend outwardly from the lower region of the case 80.

The airbag cover 110 is formed from soft synthetic resin such as thermoplastic elastomer of polyolefin (TPO). As shown in FIGS. 4, 5, 27 and 28, the airbag cover 110 covers the emergence opening 80*a* of the case 80, and includes a door section 111 which is openable for allowing airbag deployment when pushed by the airbag 45. The airbag cover 110 is fixed to the case 80 at predetermined portions with not-shown mounting means.

Figure 14:
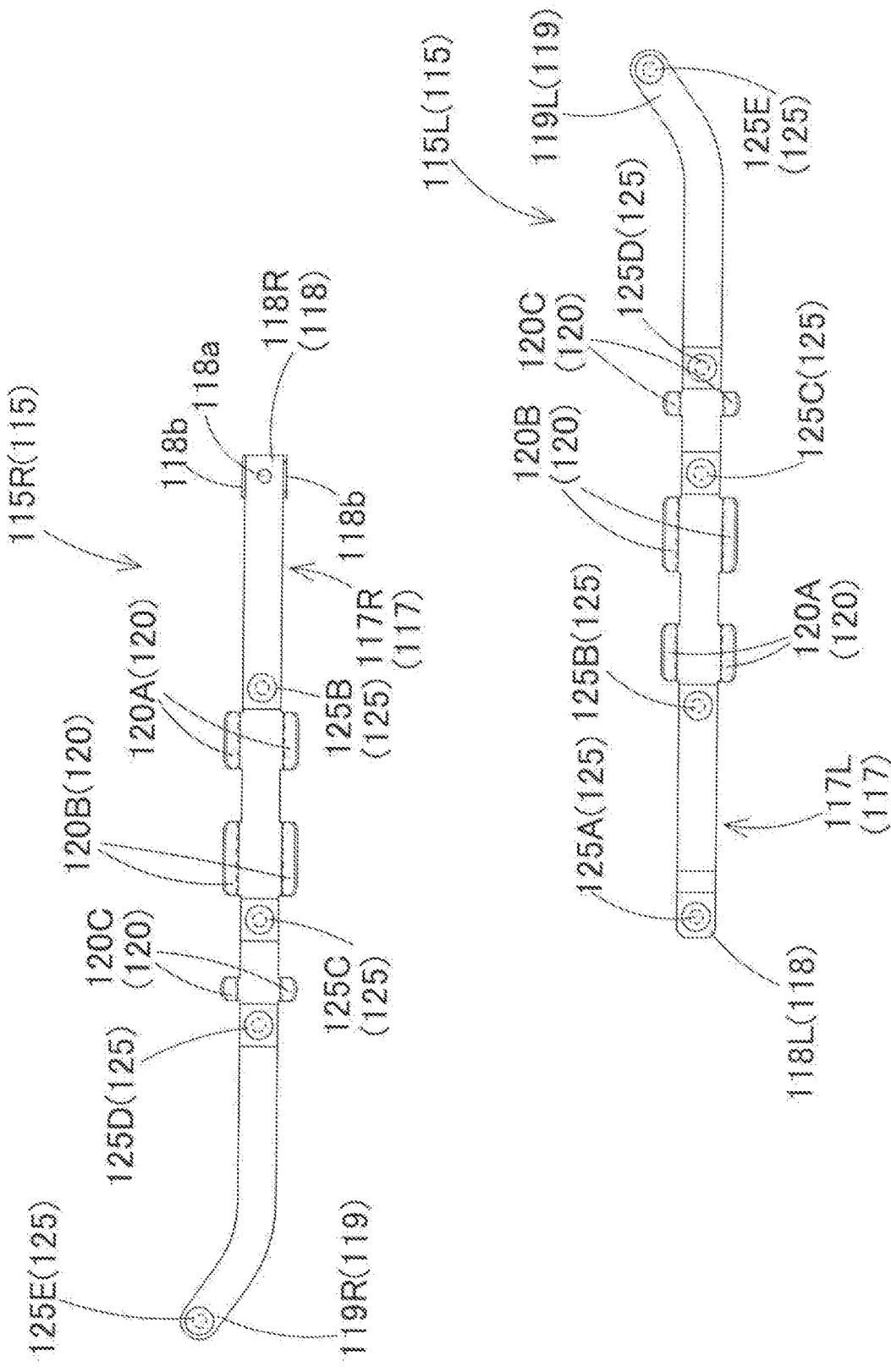
FIG. 14 is a plan view of a pair of mounting brackets used in the airbag device of the embodiment.
Figure 15:
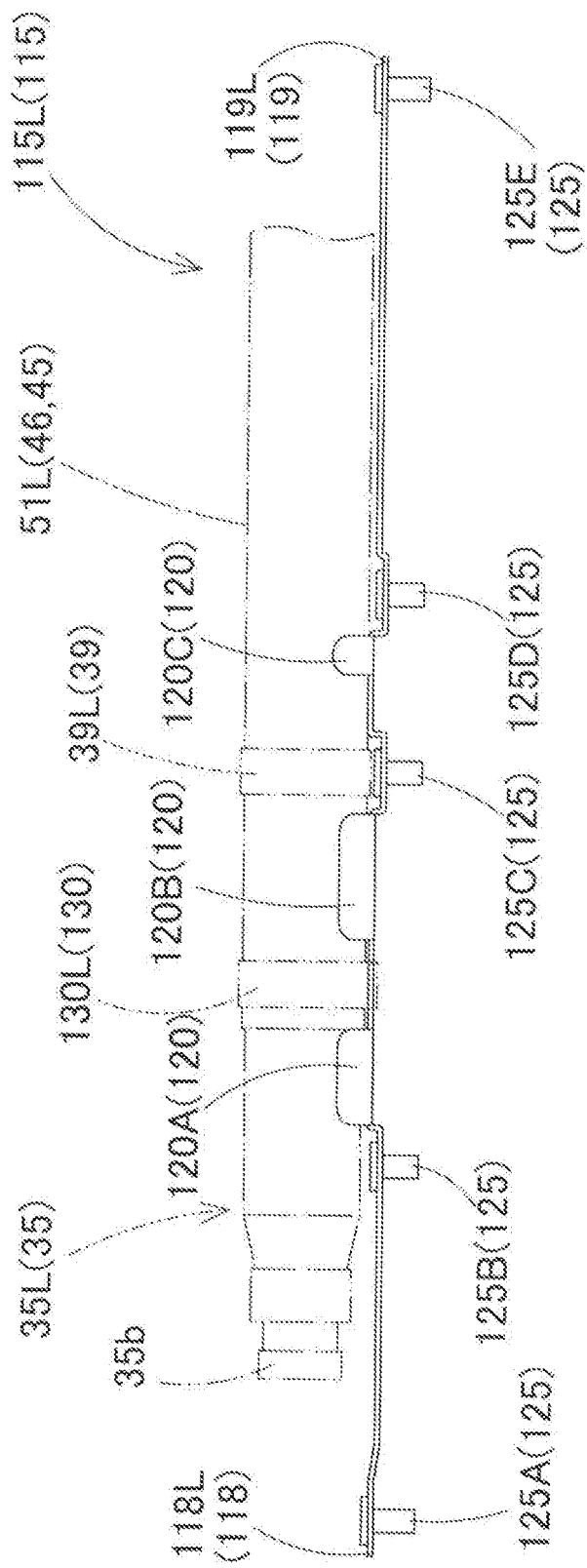
FIG. 15 is a front elevation of the left mounting bracket.
Figure 20:
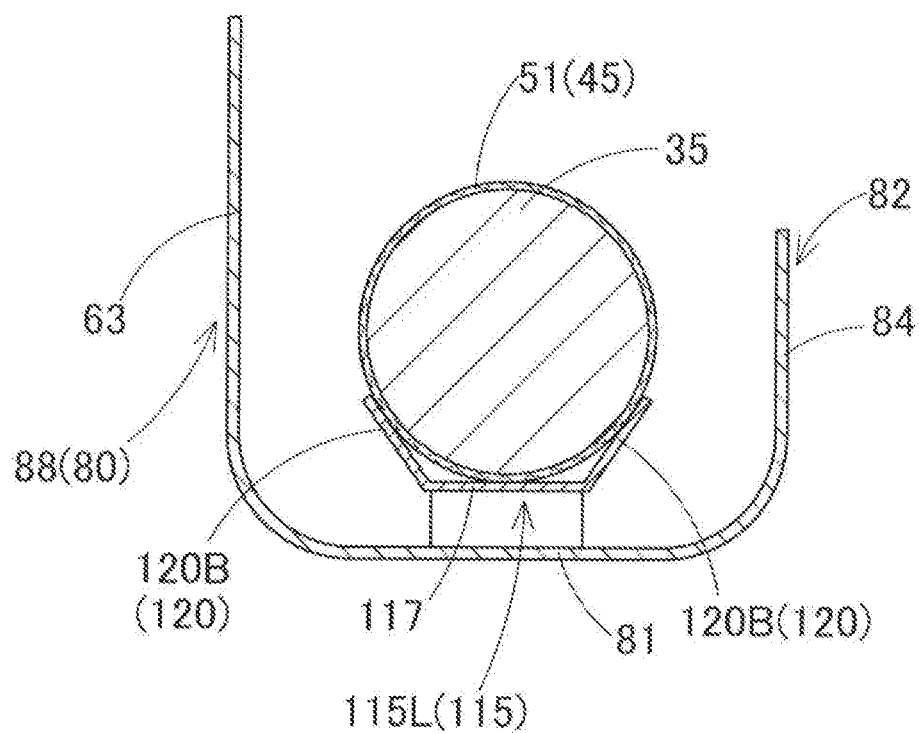
FIG. 20 is a sectional view taken along line XX-XX of FIG. 17.

There are provided a pair of mounting brackets 115 (115L and 115R) for mounting the inflators 35 (35L and 35R) and airbag 45 on the case 80, as shown in FIGS. 6 and 14. The mounting brackets 115 are formed into generally bilaterally symmetrical contours. As shown in FIGS. 14 and 15, each of the mounting brackets 115L and 115R includes a supporting section 117 (117L/117R) which supports the undersides of the inflator 35 (35L/35R) and airbag 45, and a plurality of mounting bolts 125 (125A, 125B, 125C, 125D and 125E) which protrude downwardly from the supporting section 117. Each of the supporting sections 117L and 117R is formed of a sheet metal into a band extending generally along a left and right direction. The outer end 119L/119R region of each of the supporting sections 117, which is disposed in the outer side in a left and right direction, is bent towards the rear with respect to the rest of the supporting section 117. As shown in FIG. 20, each of the supporting sections 117 is provided, in its area for holding the inflator 35, a plurality of pairs of support tongues 120 (120A, 120B and 120C) which support the inflator 35. In each of the pairs, the support tongues 120 (120A, 120B and 120C) extend diagonally upward and outwardly in a front and rear direction from the front and rear edges of the supporting section 117. The three pairs of the support tongues 120A, 120B and 120C are disposed spaced-apart in an inner area in the left and right direction of each of the supporting section 117. As shown in FIGS. 6 and 14, the left mounting bracket 115L and right mounting bracket 115R have generally the same structure except the inner end 118L and 118R region which are to be disposed generally at the center in a left and right direction of the vehicle when mounted on board. The left mounting bracket 115L is provided with five mounting bolts 125A, 125B, 125C, 125D and 125E which protrudes downwardly. Specifically, in the mounting bracket 115L, the mounting bolts 125 are disposed at a vicinity of the outer end 119L, at a vicinity of the inner end 118L, on the inner side of the supporting tongues 120A which are disposed towards the inner end 118L, on the outer side of the supporting tongues 120C which are disposed towards the outer end 119L, and between the supporting tongues 120C and supporting tongues 120B which are disposed between the supporting tongues 120A and 120C. The right mounting bracket 115R is provided with four mounting brackets 125B, 125C, 125D and 125E at positions corresponding to those in the left mounting bracket 115L. At a vicinity of the inner end 118R of the right mounting bracket 115R, there is provided, instead of a mounting bolt, a mounting hole 118a for receiving the mounting bolt 125A of the left mounting bracket 115L. The left and right mounting brackets 115L and 115R are mated by putting the mounting bolt 125A through the mounting hole 118a. As shown in FIGS. 6, 17 and 21, in the right mounting bracket 115R, there are provided a pair of stopper tongues 118b which protrude upward from the front and rear edges of the inner end 118R region. The stopper tongues 118b hold the inner end 118L region of the left mounting bracket 115L as mated with the right mounting bracket 115R from moving towards the front or rear.

As shown in FIGS. 17 and 18, the mounting brackets 115L and 115R are disposed beneath the folded-up body 145 (i.e. the airbag 45) as coupled with the inflators 35, and a clamp 130 is mounted around each of the inlet port sections 51 of the airbag 45 at a position between the supporting tongues 120A and 120B in order to bind the inlet port section 51 of the airbag 45, the inflator 35 and the supporting section 117 of the mounting bracket 115. Thus each of the mounting brackets 115L and 115R is coupled with the airbag 45 and inflator 35. In the illustrated embodiment, a not-shown breakable tape member is supplementarily used to bind the airbag 45 as folded up and mounting brackets 115 together at other positions. As shown in FIG. 22, the mounting bolt 125E of each of the mounting brackets 115, which is disposed proximate the outer end 119 of each of the brackets 115, is put through the mounting holes 62b and 63b formed at the leading ends 62a and 63a of the mounting belts 62 and 63 of the airbag 45. As shown in FIG. 19, each of the mounting bolts 125C which is disposed between the supporting tongues 120B and 120C is put through the mounting hole 64b formed at the leading end 64a of each of the mounting belts 64. Further, as shown in FIG. 21, the mounting bolt 125A disposed at the inner end 118L of the mounting bracket 115L is put through the mounting hole 65b formed at the leading end 65a of the mounting belt 65. The mounting brackets 115 as coupled with the airbag 45 and inflators 35 as described above are set in the case 80 such that the mounting bolts 125 go through and protrude downwardly from the bottom wall 81 of the case 80. The mounting bolts 125 are then fastened with nuts 126, thus the airbag 45 and inflators 35 are mounted on the case 80. At this time, the mounting belts 62, 63, 64 and 65 are anchored to the case 80 by the leading ends 62a, 63a, 64a and 65a.

Figure 23:
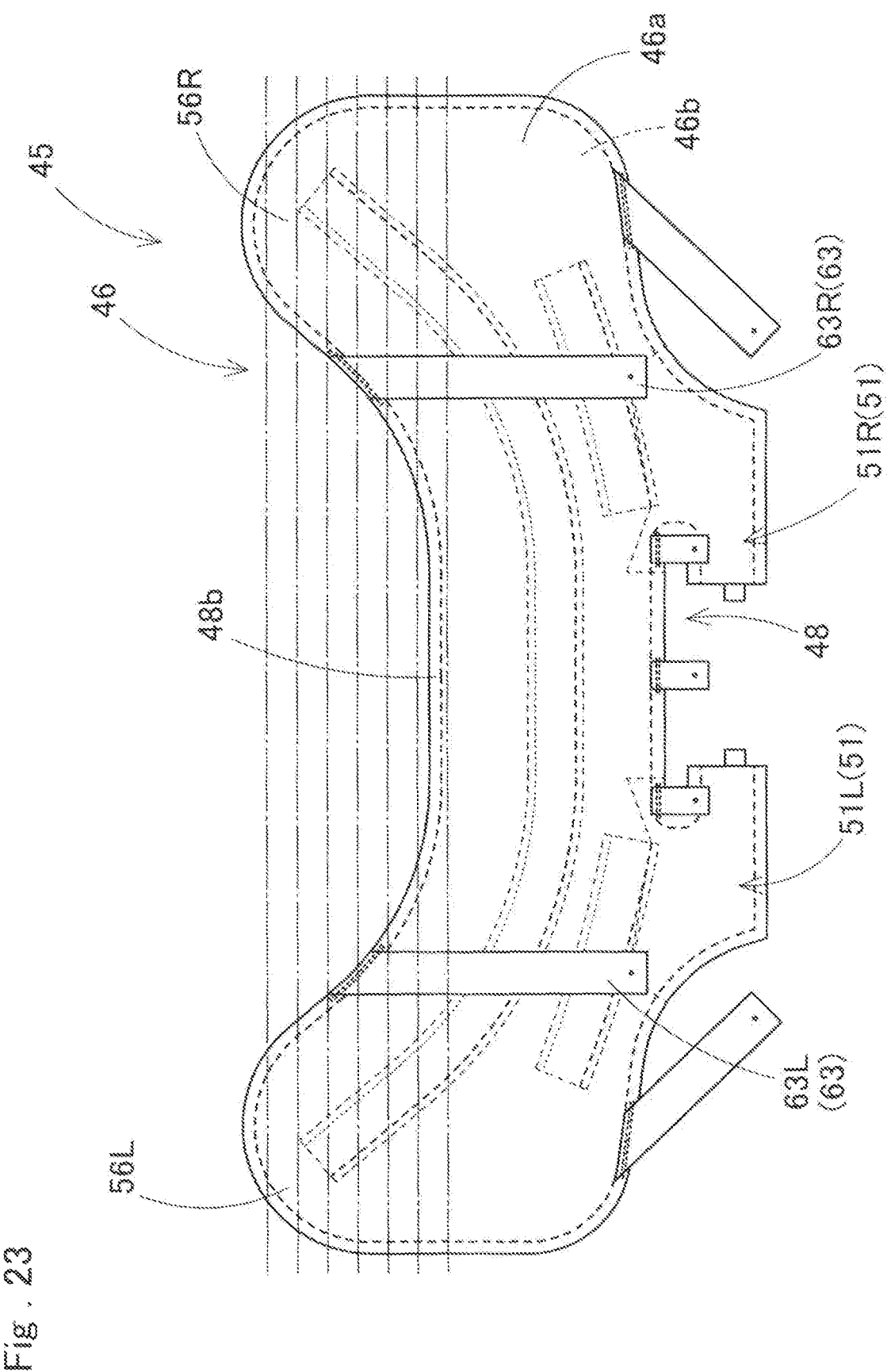

Mounting of the airbag device M on the vehicle V is now described. Firstly, the airbag 45 is folded up for storage in the case 80. The airbag 45 is folded up from a state in which the vehicle-side wall 46a and the pedestrian-side wall 46b are developed and flattened. The folding process of the airbag 45 of the illustrated embodiment is composed of a front-rear contracting folding step in which the airbag 45 is contracted in size in a front and rear direction, and a transversely contracting folding step in which the airbag 45 is contracted in size in a left and right direction. To describe more specifically, as shown in FIGS. 23 and 24A, the front-rear contracting folding step starts with rolling of the vertical inflatable portions 56L and 56R of the bag body 46 towards the vehicle-side wall 46a from the leading end (or rear end), together with the mounting belts 63, to a vicinity of the rear edge 48b of the transverse inflatable portion 48. This rolling provides a rolled portion 141 each on the left and right sides. Subsequently, as shown in FIGS. 24B and 25A, the transverse inflatable portion 48 is folded up into concertinas on a plurality of transverse creases CL1 to a vicinity of the front edge 48a, thereby providing a concertina-fold portion 142. Thereafter, as shown in FIGS. 24B and 25A, the inlet port sections 51L and 51R are each folded on a crease CL2 at a vicinity of the rear end of the leading end regions 53L and 53R, thus providing a great-width fold portion 143 (143L and 143R) each on the left and right sides. Here, the great-width fold portion 143 is greater in width than the concertina-fold portion 142. Then as shown in FIGS. 25A and 25B, each of the great-width fold portions 143 is folded to cover the front side and lower side of the concertina-fold portion 142 as mounted on board. Each of the great-width fold portions 143 has such a contour that the root region 52 and leading end region 53 of the inlet port section 51 overlap. Thus the front-rear contracting folding step is completed, and the airbag 45 is formed into a front-rear contracted form, as shown in FIG. 25B, which will hereinafter be called a front-rear contracted bag 140. Then the transversely contracting folding step follows. As shown in FIGS. 25B and 25C, the left end 140a region and right end 140b region of the front-rear contracted bag 140 are each folded towards the center in the left and right direction on a crease CL3, at a vicinity of the outer end in the left and right direction of the inlet port section 51L/51R. The left end 140a region and right end 140b region, in other words, the regions to the left and right ends 140a and 140b with respect to the creases CL3, are further folded back on itself in a bellows fashion on a plurality of (two, in the illustrated embodiment) creases CL4, thus providing a bellows-fold portion (a transversely-contracted fold portion) 146L/146R each on the left and right sides. The bellows-fold portions 146L and 146R are formed above the great-width fold portions 143L and 143R in a stratified fashion. Thus the transversely contracting folding step is completed, and a folded-up body 145, i.e. the airbag 45 as completely folded up, is provided. In the folded-up body 145 of the illustrated embodiment, each of the bellows-fold portions 146L and 146R is formed to overlap with an outer half area in the left and right direction of each of the inlet port sections 51L and 51R. Further, as shown in FIG. 5 and FIG. 16 (with double-dotted lines), each of the bellows-fold portions 146 is laid on its side and stored inside the end region 89L/89R together with the great-width fold portion 143L/143R (i.e. the inlet port section 51L/51R as folded up) such that the bellows-fold portion (i.e. the transversely-contracted fold portion) 146 is disposed at the rear of the great-width fold portion 143 (i.e. the inlet port section 51). When stored inside the case 80, each of the great-width fold portions 143 is disposed between the front wall 83, bottom wall 81 of the case 80 and the concertina-fold portion 142 and covers the front side and lower side of the concertina-fold portion 142, as shown in FIG. 5. Moreover, as shown in FIG. 4, the central folded-up portion 147 of the folded-up body 145, which is composed exclusively of the concertina-fold portion 142, is disposed on the inflators 35 inside the central region 88 of the case 80 such that the concertina folds pile up in an up and down direction. That is, as shown in FIG. 6, when stored in the case 80, the folded-up body 45 of the illustrated embodiment is twisted from the state shown in FIG. 25C such that the bellows-fold portions 146L and 146R fall backwards with respect to the central folded-up portion 147.

When the folding of the airbag 45 is finished, a breakable tape member (or wrapping member) 160 is wrapped around the folded-up body 145 for keeping the folded-up configuration, as shown in FIG. 6. At this time, the inlet openings 51a of the inlet port sections 51 and the leading ends 62a, 63a, 64a and 65a of the mounting belts 62, 63, 64 and 65 are kept free from binding by the wrapping member 160. Then each of the inflators 35 is inserted into the opening 51a of each of the inlet port sections 51 such that the gas releasing region 36 is disposed inside the airbag 45, and then the clamp 39 is used to couple the inflator 35 and the inlet port section 51. At this time, each of the inflators 35 is inserted into each of the inlet port sections 51 such that the gas releasing section 36 is disposed in front of (or under) a vicinity of the center in the left and right direction of the bellows-fold region 146L/146R, as shown in the parenthesis of FIG. 25C. Thereafter, the mounting brackets 115L and 115R are placed beneath the folded-up body 145, then the clamps 130 are used to couple the inflators 35, the folded-up body 145 (i.e. the airbag 45) and the mounting brackets 115. Further, as described above, not-shown breakable tape members are supplementarily mounted around predetermined positions of the folded-up body 145 and supporting sections 117 of the mounting brackets 115. At this time, the mounting bolt 125A disposed at the inner end 118L of the left mounting bracket 115L is put through the mounting hole 118a disposed at the inner end 118R of the right mounting bracket 115R such that the left and right mounting brackets 115L and 115R are mated. The mounting bolts 125A, 125C and 125E are then put through the mounting holes 62b, 63b, 64b and 65b disposed at the leading ends 62a, 63a, 64a and 65a of the corresponding mounting belts 62, 63, 64 and 65, thus an airbag module is finished. Thereafter, as described above, the airbag module is stored in the case 80 such that the mounting bolts 125 go through the bottom wall 81 and protrude downwardly while the bellows-fold portions 146L and 146R are twisted with respect to the central folded-up portion 147. Then if the mounting bolts 125 are fastened with nuts 126, the airbag 45 and the inflators 35 are mounted on the case 80 and, the mounting belts 62, 63, 64 and 65 of the airbag 45 are anchored to the case 80. Then the airbag cover 110 is mounted on the case 80, and the brackets 102 extending from the case 80 are secured to the cowl panel 7a. If then the inflators 35 are connected with the not-shown actuating circuit, the airbag device M is mounted on the vehicle V.

With the airbag device M for pedestrian protection of the foregoing embodiment, when the actuating circuit detects an impact against a pedestrian based on a signal fed from the sensor mounted on the front bumper 6, the actuators 28 of the hood lifting device 25 will be actuated so the piston rods 30 push up the rear end 15c of the hood 15, such that an opening will be formed between the rear end 15c of the hood 15 and the cowl 7 for allowing the airbag to emerge therefrom. Generally simultaneously, the inflators 35 will be actuated and inflate the airbag 45, and the airbag 45 will push and open the door 111 of the airbag cover 110 and emerge from the emergence opening 80a of the case 80 formed by opening of the door 111, then deploy rearwardly and upwardly and cover the upper surface of the cowl 7 and the front surfaces of the front pillars 5L and 5R, as shown in FIGS. 26 to 28.

Figure 29A:
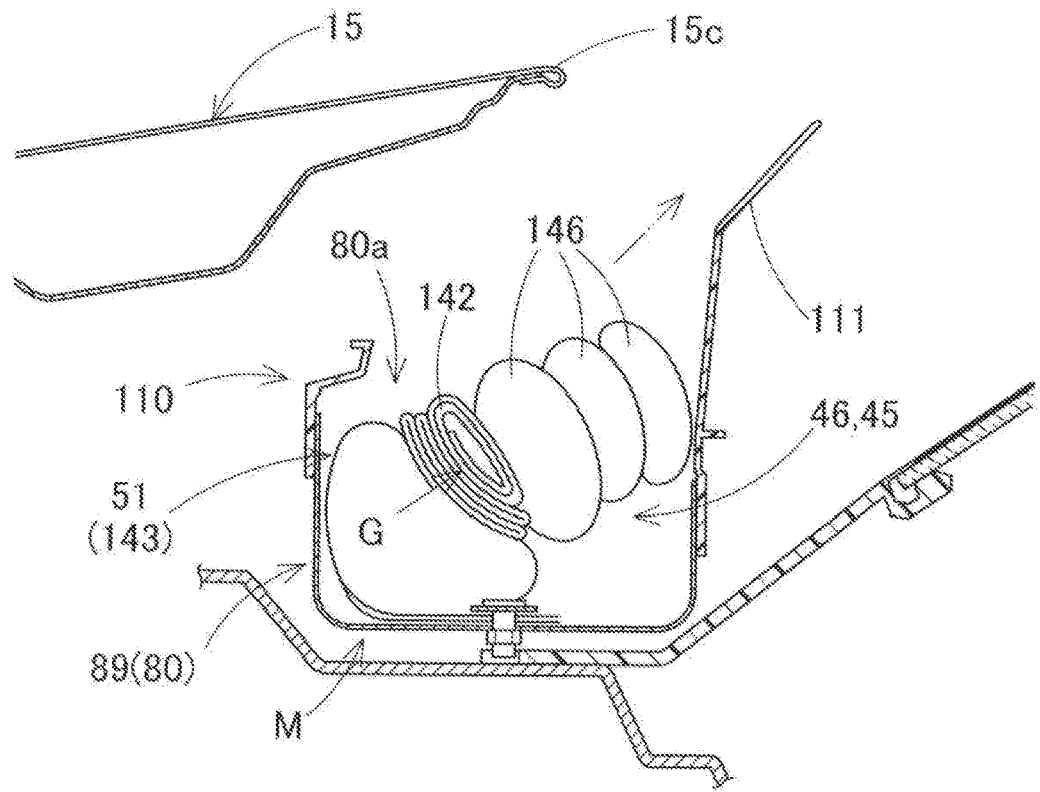
FIGS. 29A and 29B are schematic vertical sectional views illustrating the deployment process of the airbag.
Figure 29B:
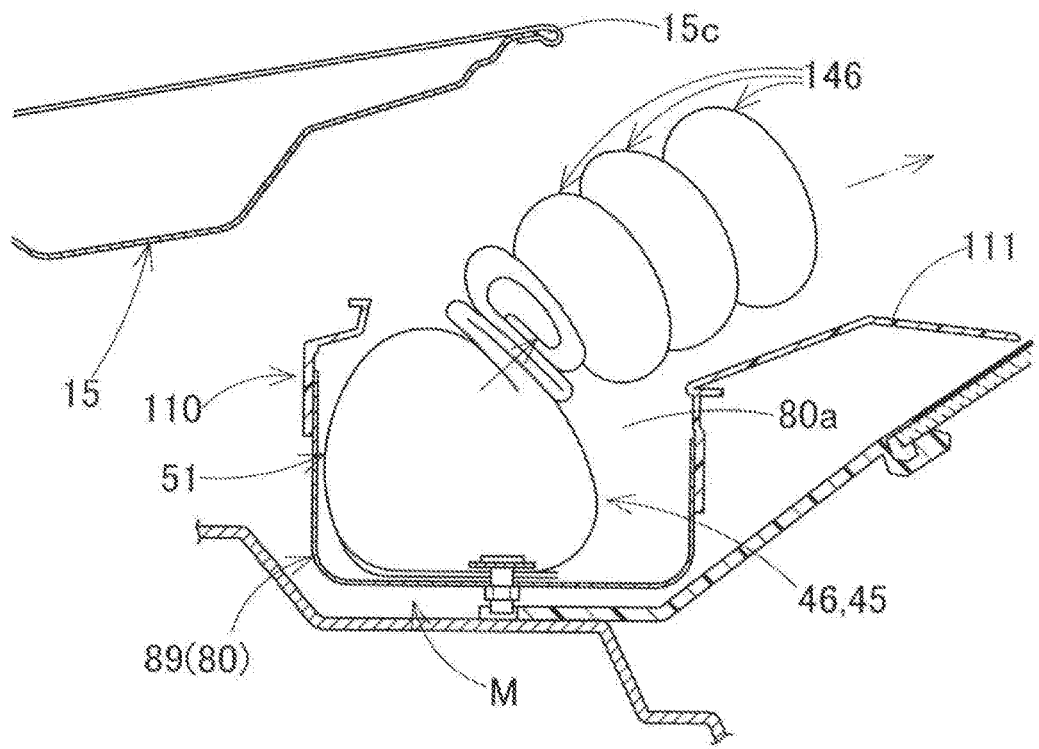
Figure 30A:
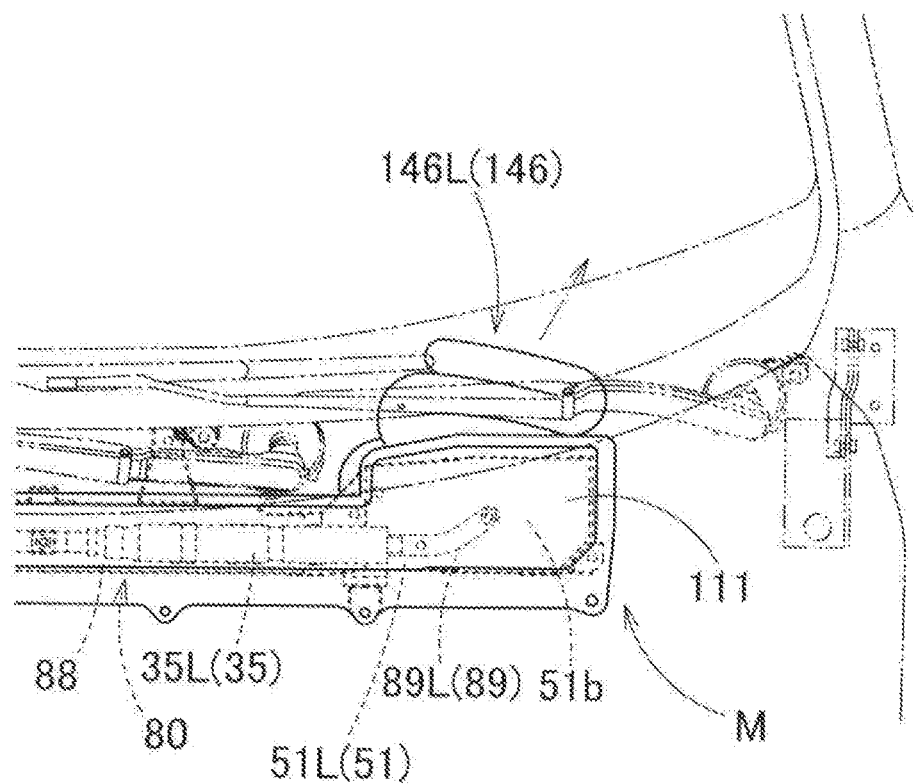
FIGS. 30A, 30B and 31 are schematic plan views illustrating the deployment process of the airbag.
Figure 30B:
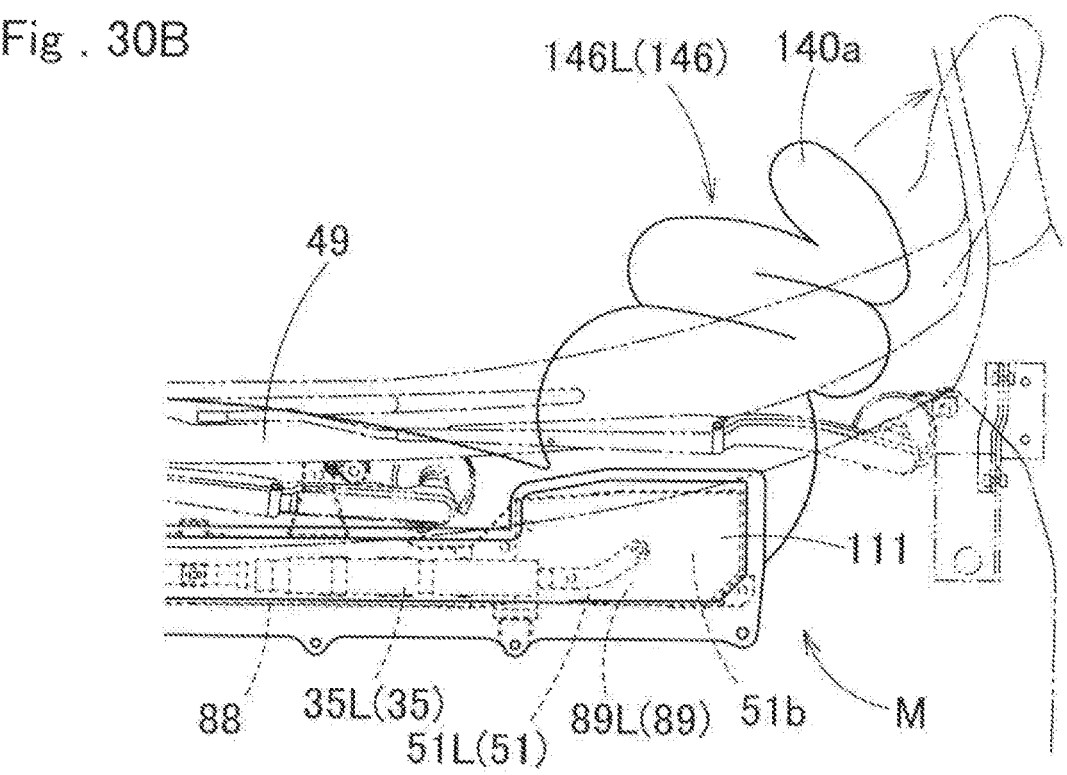
Figure 31:
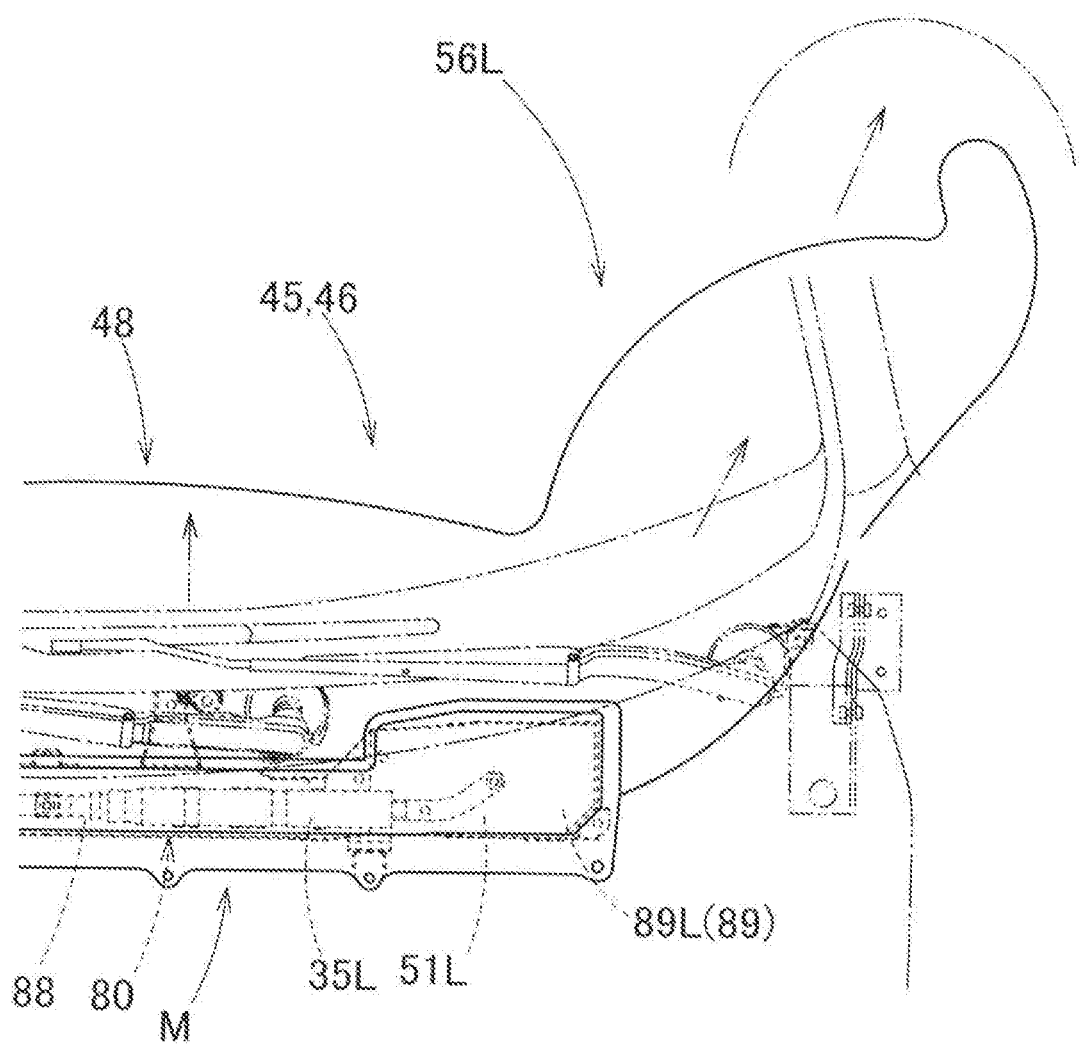

In the airbag device M of the foregoing embodiment, in the airbag 45, each of the bellows-fold portions (i.e. transversely-contracted fold portion) 146L and 146R, which have been formed in the transversely contracting folding step, and each of the inlet port sections 51L and 51R are arranged in a stratified fashion inside the case 80. With this configuration, in an initial stage of airbag deployment, each of the inlet port sections 51L and 51R firstly takes in an inflation gas and is inflated into a tube. As shown in FIGS. 29A and 29B, the inlet port sections 51L and 51R as inflated then push up the bellows-fold portions 146L and 146R directly and push them out of the case 80. To describe more specifically, the inflation gas discharged from the gas releasing region 36 of each of the inflators 35 flows into a gas reservoir region 51b (see FIG. 25C, double-dotted lines and FIGS. 30A and 30B) disposed at the outer end in a left and right direction of the inlet port section 51, and once stays therein, and then pushes the bellows-fold region 146 (146L, 146R) rearward and pushes it out of the case 80. Then as shown in FIGS. 30A, 30B and 31, each of the bellows-fold regions 146 unfolds and is inflated, such that the vertical inflatable portions 56 deploy quickly. Therefore, although the airbag 45 is great in size in a left and right direction enough to cover an entire area in the vehicle width direction of the cowl 7, the airbag device M of the foregoing embodiment is capable of quickly deploying the bellows-fold portions (i.e. transversely-contracted fold portions) 146, which was formed in the transversely-contracting folding step, in the initial stage of airbag deployment, and is capable of deploying the airbag 45 more quickly than a conventional airbag device for pedestrian protection.

Therefore, the airbag device M for pedestrian protection of the foregoing embodiment is capable of deploying the airbag 45 quickly.

In the airbag device M of the foregoing embodiment, the inlet port sections 51 (51L and 51R) are disposed at two positions spaced-apart in the vehicle width direction (i.e. in the left and right direction), while the inflators 35 (35L and 35R) are disposed at two positions spaced-apart in the vehicle width direction correspondingly, so as to be coupled with the inlet port sections 51. This configuration will help inflate the airbag 45 quickly in a balanced fashion in the vehicle width direction with the two inlet port sections, especially when the transverse inflatable portion 48 is elongated in the vehicle width direction, as in the foregoing embodiment. If such an advantageous effect does not have to be considered, the airbag may be provided with only one inlet port section.

In the airbag device M of the foregoing embodiment, furthermore, each of the bellows-fold portions (i.e. transversely-contracted fold portions) 146 (146L, 146R) of the folded-up body 145 is twisted with respect to the central folded-up portion 147 such that the bellows-fold portion 146 (146L, 146R) is disposed at the rear of the inlet port section 51 (51L, 51R) when housed in the end region 89 (89L, 89R) of the case (i.e. housing) 80. With this configuration, the inlet port section 51 will be able to push the bellows-fold portion 146 rearward further smoothly in the initial stage of airbag deployment. In the foregoing embodiment, especially, each of the inlet port sections 51 (51L, 51R) is folded up into the great-width fold portion 143 (143L, 143R) and each of the great-width fold portions 143 is disposed over the front side and lower side of the concertina-fold portion 142 between the bottom wall 81 of the case 80 and the concertina-fold portion 142. With this configuration, in the initial stage of airbag deployment, the inlet port sections 51 as has taken in an inflation gas and been inflated will be able to push the bellows-fold portions 146 (146L and 146R) rearward and upward and help the bellows-fold portions 146 to protrude out of the emergence opening 80a of the case 80, as shown in FIG. 29. If such an advantageous effect as described above does not have to be considered, the folded-up body of the airbag may be stored in the case in an untwisted configuration such that the inlet port section is disposed beneath the transversely-contracted fold portion, or such that the inlet port section and the transversely-contracted fold portion are merely arranged in a stratified fashion.

In the airbag device M of the foregoing embodiment, especially, the bellows-fold portions (i.e. transversely-contracted fold portion) 146L and 146R are formed by folding up the left and right end regions of the front-rear contracted bag 140, which are disposed to the left and right ends 140a and 140b with respect to the creases CL3, in a bellows fashion on a plurality of (two, in the illustrated embodiment) creases CL4, above the great-width fold portions 143. In other words, an entirety of each of the bellows-fold portions (i.e. transversely-contracted fold portions) 146L and 146R overlaps with the inlet port section 51. With this configuration, in the initial stage of airbag deployment, the gas reservoir regions 51b of the inlet port sections 51, which take in an inflation gas and are inflated first, will be able to push rearward the whole bellows-fold portions (transversely-contracted fold portions) 146, i.e., the outer end regions in the left and right direction of the front-rear contracted bag 140 with respect to the inlet port sections 51, such that the bellows-fold portions 146 will unfold quickly and the airbag 45 will be deployed quickly. If such an advantageous effect does not have to be considered, the end regions of the front-rear contracted bag may be folded back each with a crease positioned at a vicinity of the outer end in a left and right direction of the inlet port sections, and disposed in the area of the central fold portion.

In the airbag device M of the foregoing embodiment, furthermore, the central folded-up portion 147 of the folded-up body 145, i.e. the portion disposed generally at the center in the vehicle width direction of the folded-up body 145, is disposed on the inflators 35 in the central region 88 of the case 80. This configuration will be conducive to reduction of width in a front and rear direction of an area of the case 80 for housing the central folded-up portion 147, and further conducive to size reduction of the whole case 80.

The airbag 45 of the foregoing embodiment is formed by sewing the vehicle-side wall 46a and pedestrian-side wall 46b together on the outer circumferential edges with a sewing thread. However, the present invention may be applied to an airbag formed by one-piece woven technology.

What is claimed is:

1. An airbag device for pedestrian protection adapted to be mounted on a vehicle which includes a hood and a cowl disposed below a rear edge of the hood, the airbag device comprising:
   a housing that is adapted to be mounted on a vicinity of a rear end of the hood;
   an inflator which discharges an inflation gas; and
   an airbag that is stored in the housing in a folded-up configuration and is inflatable with the inflation gas fed by the inflator and protrudes from the housing at deployment, the airbag comprising:
      a transverse inflatable portion that is designed to be deployed generally along a width direction of the vehicle in order to cover the cowl; and
      an inlet port section that is disposed in a vicinity of a front end of the transverse inflatable portion to be coupled with the inflator in order to take in the inflation gas, the inlet port section being formed into a tube deployable generally along the vehicle width direction,
   wherein at least the transverse inflatable portion is composed of a vehicle-side wall deployable on a lower side and a pedestrian-side wall deployable on an upper side, the vehicle-side wall and pedestrian-side wall being generally identical in outer contour and sewn together by circumferential edges thereof to form the transverse inflatable portion;
   wherein the airbag has been folded up through a front-rear contracting folding step that reduces the airbag in size in a front and rear direction and provides a front-rear contracted bag, which is a form of the airbag which has gone through the front-rear contracting folding step; and a transversely contracting folding step which folds the front-rear contracted bag with a crease at a vicinity of an outer end in a left and right direction of the inlet port section in order to reduce the front-rear contracted bag in size in a left and right direction;
   wherein the inlet port section and a transversely-contracted fold portion, which is a portion of the airbag folded up in the transversely contracting folding step, are arranged in a stratified fashion;
   wherein the transversely-contracted fold portion is disposed at the rear of the inlet port section; and
   wherein the front-rear contracted bag includes a concertina-fold portion and a great-width fold portion, the concertina-fold portion is provided by folding the transverse inflatable portion into concertinas, the great-width fold portion is provided by folding the inlet port section, the great-width fold portion is greater in width than the concertina-fold portion, and the great-width fold portion covers a front side and lower side of the concertina-fold portion.

2. The airbag device for pedestrian protection of claim 1, wherein:
   the inlet port section is disposed at two positions spaced-apart in the vehicle width direction; and
   the inflator is disposed at two positions spaced-apart in the vehicle width direction to be coupled with the respective inlet port section.

3. The airbag device for pedestrian protection of claim 2, wherein:
   each of the inflators is cylindrical in outer contour and includes a gas releasing region for discharging the inflation gas at an end region in an axial direction thereof;
   the two inflators are stored inside the housing such that the inflators extend generally along the vehicle width direction and the gas releasing regions face away from each other when mounted on the vehicle; and
   a central folded-up portion, which is disposed generally at the center in the vehicle width direction of the airbag as folded up, is disposed on the inflators in the housing.

4. The airbag device for pedestrian protection of claim 1, wherein an entirety of the transversely-contracted fold portion overlaps with the inlet port section.

* * * * *